US011631340B2

(12) United States Patent
Donovan et al.

(10) Patent No.: US 11,631,340 B2
(45) Date of Patent: *Apr. 18, 2023

(54) ADAPTIVE TEAM TRAINING EVALUATION SYSTEM AND METHOD

(71) Applicant: Architecture Technology Corporation, Minneapolis, MN (US)

(72) Inventors: Matthew Donovan, Trumansburg, NY (US); Colleen Kimball, Danby, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,631

(22) Filed: Mar. 31, 2022

(65) Prior Publication Data

US 2022/0238037 A1 Jul. 28, 2022

Related U.S. Application Data

(63) Continuation of application No. 16/806,226, filed on Mar. 2, 2020, now Pat. No. 11,302,215, which is a continuation of application No. 15/707,720, filed on Sep. 18, 2017, now Pat. No. 10,600,335.

(51) Int. Cl.
| | |
|---|---|
| *G09B 19/00* | (2006.01) |
| *G09B 5/10* | (2006.01) |
| *G09B 5/12* | (2006.01) |
| *G09B 9/00* | (2006.01) |
| *H04L 9/40* | (2022.01) |

(52) U.S. Cl.
CPC .......... *G09B 19/0053* (2013.01); *G09B 5/10* (2013.01); *G09B 5/12* (2013.01); *G09B 9/00* (2013.01); *H04L 63/145* (2013.01)

(58) Field of Classification Search
CPC ... G09B 5/10; G09B 5/12; G09B 9/00; G09B 19/0053; H04L 63/145
See application file for complete search history.

(56) References Cited

U.S. PATENT DOCUMENTS

2014/0199663 A1* 7/2014 Sadeh-Koniecpol ....................... H04L 63/1408
434/118

* cited by examiner

*Primary Examiner* — Robert J Utama
*Assistant Examiner* — Correll T French
(74) *Attorney, Agent, or Firm* — Key IP Law Group, PLLC

(57) ABSTRACT

A computer-implemented adaptive group training method a computer accessing a virtual system and initiating a group training exercise for training a trainee group comprising one or more trainees, the group training exercise including one or more challenges to the virtual system, each of the one or more challenges including a pre-defined sequence of one or more injectable events; the computer controlling subsequent execution of the group training exercise comprising injecting the injectable events; and the computer evaluating performance of the trainee group during the subsequent execution of the group training exercise, including analyzing actions taken by the trainee group in response to each of the injections, and attributing one or more of the actions taken to a trainee.

20 Claims, 35 Drawing Sheets

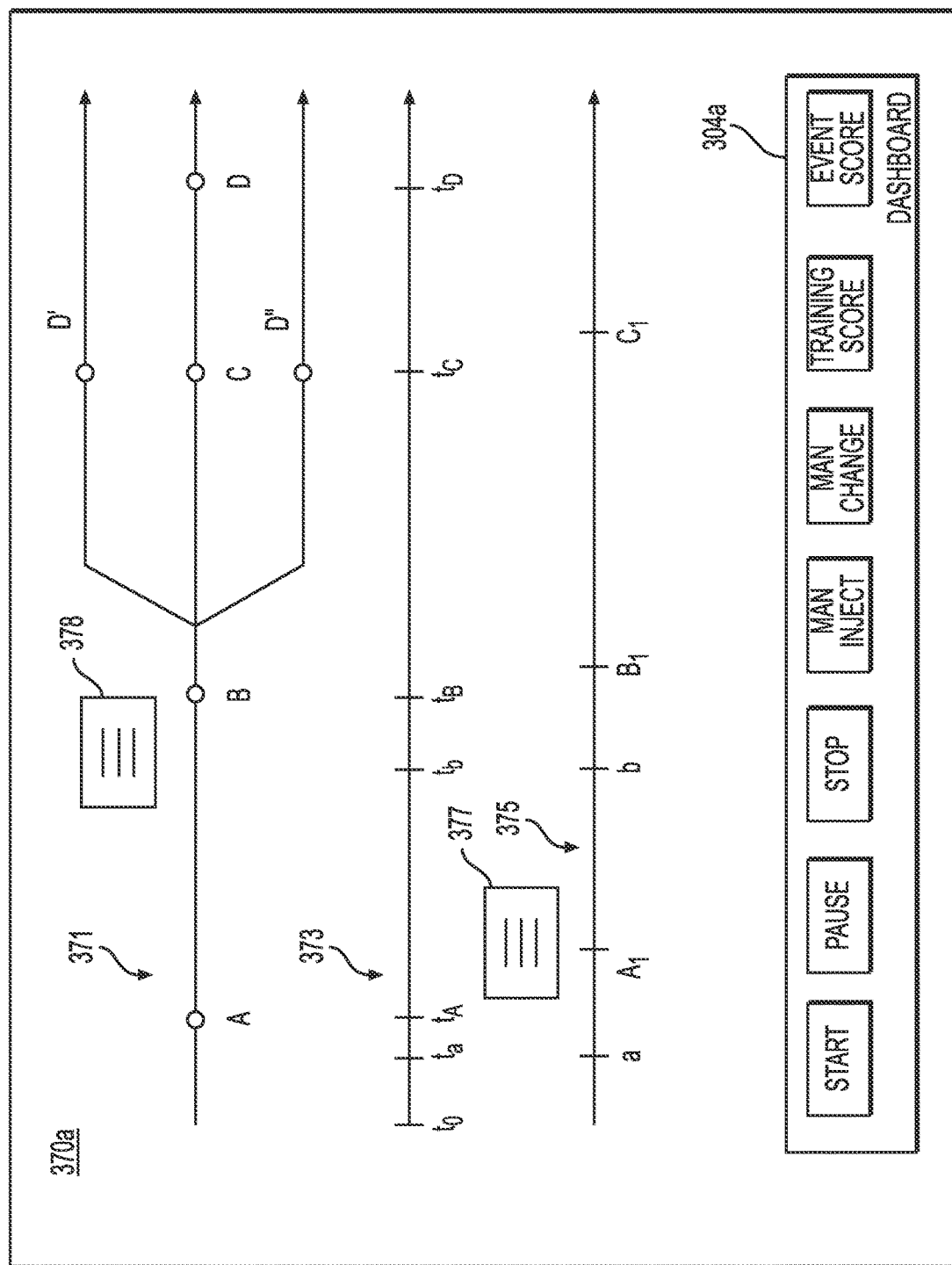

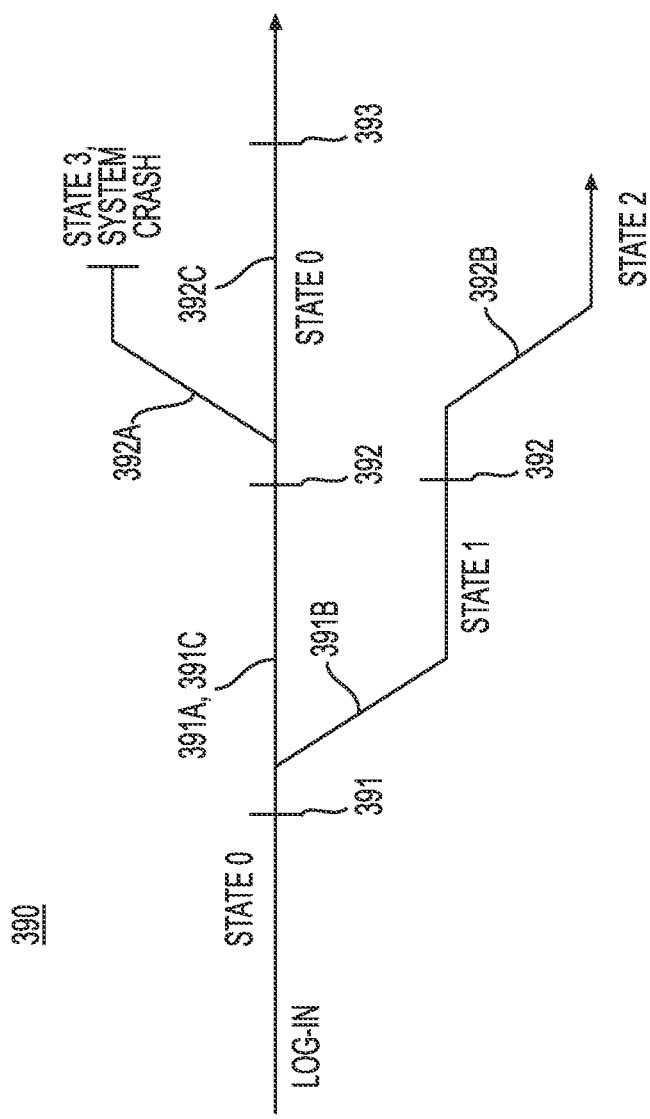

*(CONT.-1)*

ADAPTIVE TEAM TRAINING EVALUATION SYSTEM AND METHOD

RELATED APPLICATIONS

This application is a continuation of patent application Ser. No. 16/806,226, filed Mar. 2, 2020 and entitled "Adaptative Team Training Evaluation System and Method," now U.S. Pat. No. 11,302,215 issued Apr. 12, 2022, which is a continuation of patent application Ser. No. 15/707,720, filed Sep. 18, 2017 and entitled "Adaptative Team Training Evaluation System and Method," now U.S. Pat. No. 10,600,335, issued Mar. 24, 2020. The disclosures of these patent documents are hereby incorporated by reference.

BACKGROUND

Learning generally encompasses an environment in which students receive their own personalized courses, made specifically for their strengths, weaknesses, goals, and engagement patterns. In some implementations, adaptive learning may use artificial intelligence to actively tailor course content to each student's needs, drawing upon knowledge domains as diverse as machine learning, cognitive science, predictive analytics, and educational theory.

While adaptive learning has shown promise when applied on an individual student basis, to date, adaptive training has not been effective for training groups of students. Many reasons may account for the lack of success applying adaptive training to a group training environment, including an inability to separate out individual contributions to the group. For example, past efforts to evaluate group performance have required multiple subject matter experts to observe trainees and record their observations and impressions. This approach is costly because it requires multiple human observers and can lead to subjective results due to personal bias or simply missing relevant actions due to distractions. For this and other reasons, adaptive learning not only may be very costly to implement, but also may not be effective in a group training environment.

SUMMARY

A computer-implemented adaptive group training method begins with a computer accessing a virtual system and initiating a group training exercise for training a trainee group comprising one or more trainees, the group training exercise including one or more challenges to the virtual system, each of the one or more challenges including a pre-defined sequence of one or more injectable events; the computer controlling subsequent execution of the group training exercise comprising injecting the injectable events; and the computer evaluating performance of the trainee group during the subsequent execution of the group training exercise, including analyzing actions taken by the trainee group in response to each of the injections, and attributing one or more of the actions taken to a trainee. In an example, the method further includes automatically and in real-time during execution of the group training exercise, executes a group training exercise adaptation based on the evaluated performance of the trainee group comprising stopping the pre-defined sequence and starting a second pre-defined sequence of one or more second injectable events. The method still further includes evaluating performance of the trainee group by performing a first evaluation in real-time during execution of the executing group training exercise and a second evaluation after completion of the group training exercise, and determining an action taken is one of correct and not correct based on an injected event; wherein controlling subsequent execution of the group training exercise comprises changing a state of the virtual system based on the actions taken. In an example, attributing the actions taken to a trainee includes accessing agents monitoring the virtual network to identify sources of the actions taken; accessing native sensors and trainee group sensors to identify specific trainees taking actions, times of taking actions, and content of the actions; comparing the sources, specific trainees, times and content to the actions taken to determine the origins of the actions taken; and comparing the content derived from the native sensors to stored, physical characteristics of the trainees.

In an example, the virtual system is instantiated on a plurality of virtual machines hosted on a physical computing platform, and the method further includes the computer executing a group training exercise adaptation based on availability of virtual machine resources. In another example, the virtual system is a virtual cyber range comprising a virtual network and one or more virtual network components, and the virtual network and each of the virtual network components is instantiated on a virtual machine, and wherein the one or more challenges comprise a simulated cyber warfare attack.

A system that monitors and evaluates complex actions and interactions by and among multiple trainees participating in group training exercises includes one or more processors; one or more displays, each display in communication with a processor; data input/data output devices in communication with the processor; and a program of instructions resident on a non-transitory, computer readable storage medium, the instructions executed by a processor to generate a virtual network and generates virtual network elements, the virtual network elements comprising one or more virtual machines in the virtual network, the virtual machines supplied to and resident on trainee media devices, each virtual machine in communication with a local visual display of a corresponding one of the trainee media devices, and each virtual machine in communication with one or more sensors, the processor in communication with each of the virtual machines. The processor then loads a group training exercise on each of the virtual machines, causes trainee media devices to execute the loaded group training exercise, issues challenges, each challenge having a pre-defined sequence of injectable events implemented by the processor and injected into the group training exercise, receives one or more trainee actions, in response to an injectable event, from the one or more virtual machines, executes an on-the-fly, real-time evaluation of the received trainee actions, and based on the evaluation, adapts, in real-time, the group training exercise.

DESCRIPTION OF THE DRAWINGS

The detailed description refers to the following figures in which like numerals refer to like objects, and in which:

FIGS. 3A-3G illustrate modules, components, mechanisms, devices, and tools of the program of FIG. 2A, and a corresponding training environment;

DETAILED DESCRIPTION

Figure 1A:
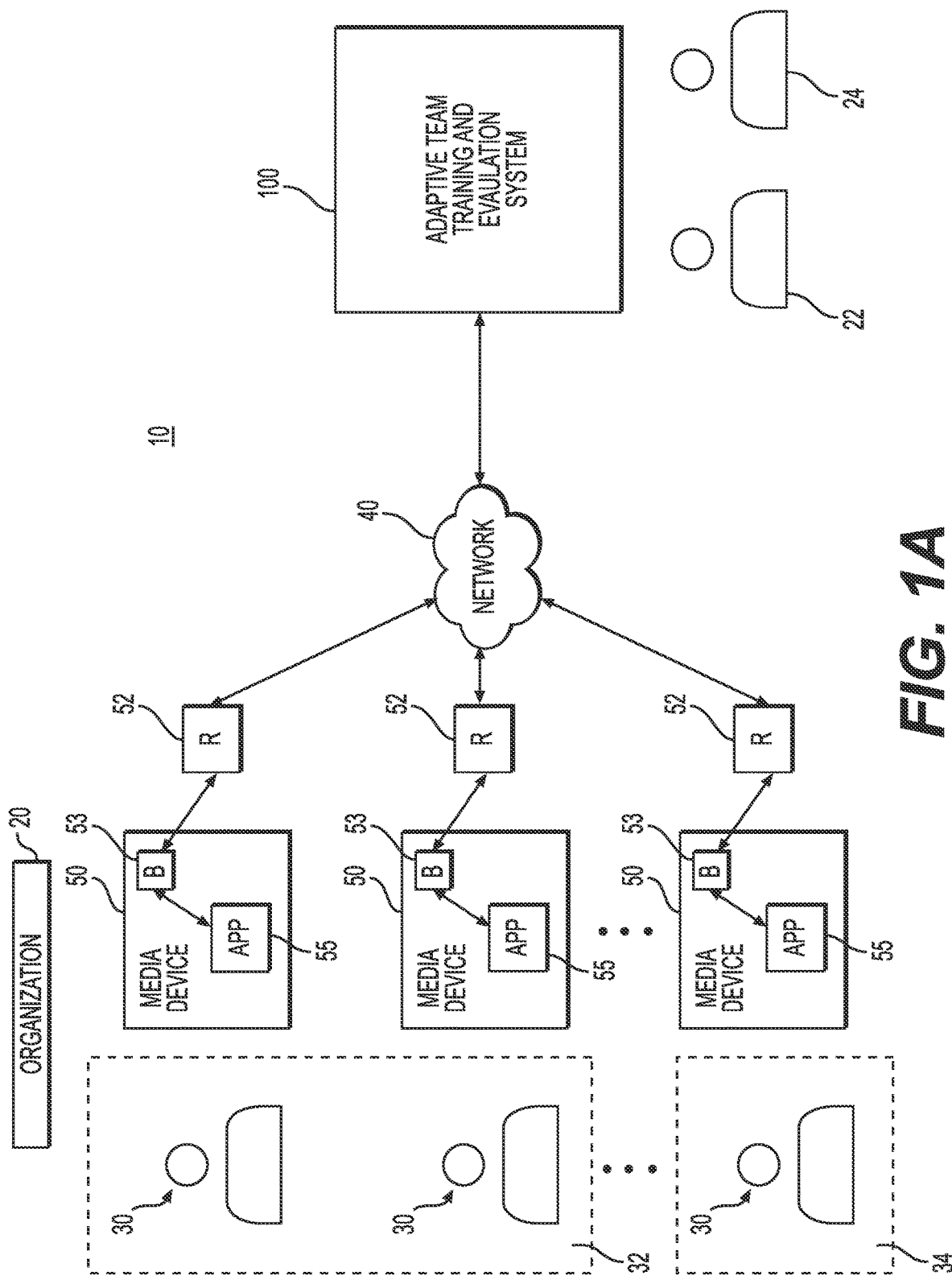
FIGS. 1A-1C illustrate an example adaptive training evaluation system in example training environments.

Current adaptive learning technologies cannot monitor and evaluate complex interactions between multiple trainees participating in a group exercise and thus are unable to accurately evaluate group exercises and tasks and assess collective, or group, expertise. Instead, current adaptive learning systems focus on evaluating students performing individual exercises and tasks. Inaccurate group exercise evaluation may result in trainees taking unnecessary or unsuitable training for their current skill level, thereby wasting time and money.

Accurate evaluate group performance evaluation requires an adaptive learning system that correlates the prior experience of individual team members, the communication/collaboration between team members, and the performance of individual team members. However, evaluating group performance and expertise is difficult; group members bring their own history and experience to a group exercise. Group members may have different educational backgrounds or prior work experience in the field. At the same time, some group members may have only a basic instructional background. Ideally, these disparities and the roles group members take in a group exercise are considered when evaluating group performance.

When current adaptive training systems are used in computer-based training environments, attribution (who did what) may be difficult to identify. Some computer-based training environments are set up to use shared credentials. Thus, a software monitor can determine that trainee X logged in and performed a task but cannot associate the trainee account with a specific person. Such attribution is necessary for accurate evaluation because group members may "pick up slack" and perform tasks assigned to other members. In many virtual training environments, trainees log into copies of pre-configured virtual machines. Shared exercise resources, such as servers, are accessed by every student using the same credentials. Because of this, current monitoring technologies cannot attribute specific actions to individual trainees. Accurate attribution is critical for correctly evaluating group expertise. Without accurate attribution, the system cannot tell the difference between one trainee performing all the required tasks and five trainees working together to accomplish the exercise.

Some existing training environments consist of static, pre-defined exercise events or are free-for-all attack/defend scenarios. These training environments lack the ability to provide a tailored exercise based on the strengths and weaknesses of the trainees. These training environments also lack the tools and technologies that enable scaffolding for computer based exercises.

To overcome these and other deficiencies with current group training and evaluation systems, disclosed herein is an Adaptive Team Training and Evaluation System (ATTEST) system, and corresponding method. The ATTEST system is a collaborative learning and assessment framework that not only provides adaptive group training exercises, but also provides a structure for monitoring and analyzing trainee performance and communication during group training exercises. In an aspect, the ATTEST system may use advanced language processing technologies to track and evaluate trainee communications and may correlate the trainee communications with changes in state of the exercise environment. Thus, the ATTEST system provides tools to allow instructors to analyze student communication and to understand how students interact and self-organize to solve problems.

In an aspect, the ATTEST system accounts for group dynamics, since group dynamics may play an important role in successful completion of a group training exercise. In addition to the overall success of a group training exercise, ATTEST system may incorporate individual trainee contributions into the evaluation.

In an aspect, the ATTEST system includes structures that ensure training exercises may be adapted automatically and in real time (e.g., during the training exercise) based on trainee performance to maintain engagement and create a challenging exercise for the trainees.

In an aspect, the ATTEST system incorporates monitoring techniques and advanced language processing to evaluate team performance in dynamic training exercises. The ATTEST system provides instructors with a clear, objective measure of a trainee group's performance during training exercise without requiring extensive preparation or use of human observers. As a result, training costs and required training time are reduced because training is tailored to trainees based on accurate evaluations.

In an aspect, the ATTEST system includes an automated, computer-based training system. This aspect of the ATTEST system may be an online system (i.e., executed over a wide area network such as the Internet). This aspect of the ATTEST system delivers remote learning content by seamlessly integrating both declarative and procedural teaching methods and incorporating multiple learning strategies to improve skill acquisition and retention. This aspect of the ATTEST system also provides instructors with flexible, configurable trainee monitoring and evaluation. Its automated feedback and evaluation capabilities allow for an anytime, anywhere capability, greatly reducing instructor workload.

FIG. 1A illustrates a training environment in which an example ATTEST system may operate. In FIG. 1A, training environment 10 includes organization 20 and trainees 30, in communication using network 40. The organization 20 includes structural training elements and ATTEST system 100 by which the organization 20 provides individual and group training exercises for the trainees 30. The trainees 30 may operate media devices 50 to communicate with each other and with structural training elements of the ATTEST system 100. The trainees 30 may be organized into one or more groups—as shown in FIG. 1A, the trainees 30 are organized into two groups, 32 and 34. In an aspect, individual trainees 30 may belong to only one of the groups 32 and 34. In another aspect, a trainee 30 may belong to both groups 32 and 34 (for ease of description, the description that follows refers to a group of trainees 30 as trainee group 32).

The network 40 may be any communications network that allows the transmission of signals, media, messages, voice, and data among the entities shown in FIG. 1A, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 40 includes the Internet, cellular systems, and other current and future mechanisms for transmission of these and other media. The network 40 may be both wired and wireless. The network 40 may be all or a portion of an enterprise or secured network. In an example, the network 40 may be a virtual private network (VPN) between the trainee 30 and the device 50 operated by the trainee 30 across a wireline or a wireless link. While illustrated as a single or continuous network, the network 40 may be divided logically into various sub-nets or virtual networks, so long as at least a portion of the network 40 may facilitate communications among the entities of FIG. 1A.

The media devices 50 may be any computing device capable of accessing resources on network 40. In an aspect, the media devices 50 may connect to the network 40 through router 52. The media devices 50 may be fixed or mobile. For example, a media device 50 may be an Internet connected "smart" television (iTV); a "basic" or "smart" television connected to a set top box (STB) or other Internet-enabled device; a Blu-Ray™ player; a game box; and a radio, for example. Media device 50 also may be a tablet, a smartphone, a lap top computer, or a desk top computer, for example. The media devices 50 may include browsers, such as browser 53. The browser 53 may be a software application for retrieving, presenting, and traversing resources such as at a Web site. A resource may be identified by a Uniform Resource Locator (URL) and may be a Web page, image, video, or other content. The URL may allow the browser 53 to connect to a Web site. Hyperlinks present in resources enable the trainee 30 to navigate the browser 53 to related resources. The trainee 30 may operate the browser 53 to search for Web sites related to specific topics or to search for a specific Web site by URL. The media devices 50 also may include applications 55, which may be supplied by the ATTEST system 100. A trainee 30 may cause a media device 50 to execute the application 55. The application 55 may involve use of means to connect to services provided through the system 100 (see FIG. 1B). The trainee 30 operates the media device 50 to communicate with other media devices 50 and with the ATTEST system 100.

Figure 1B:
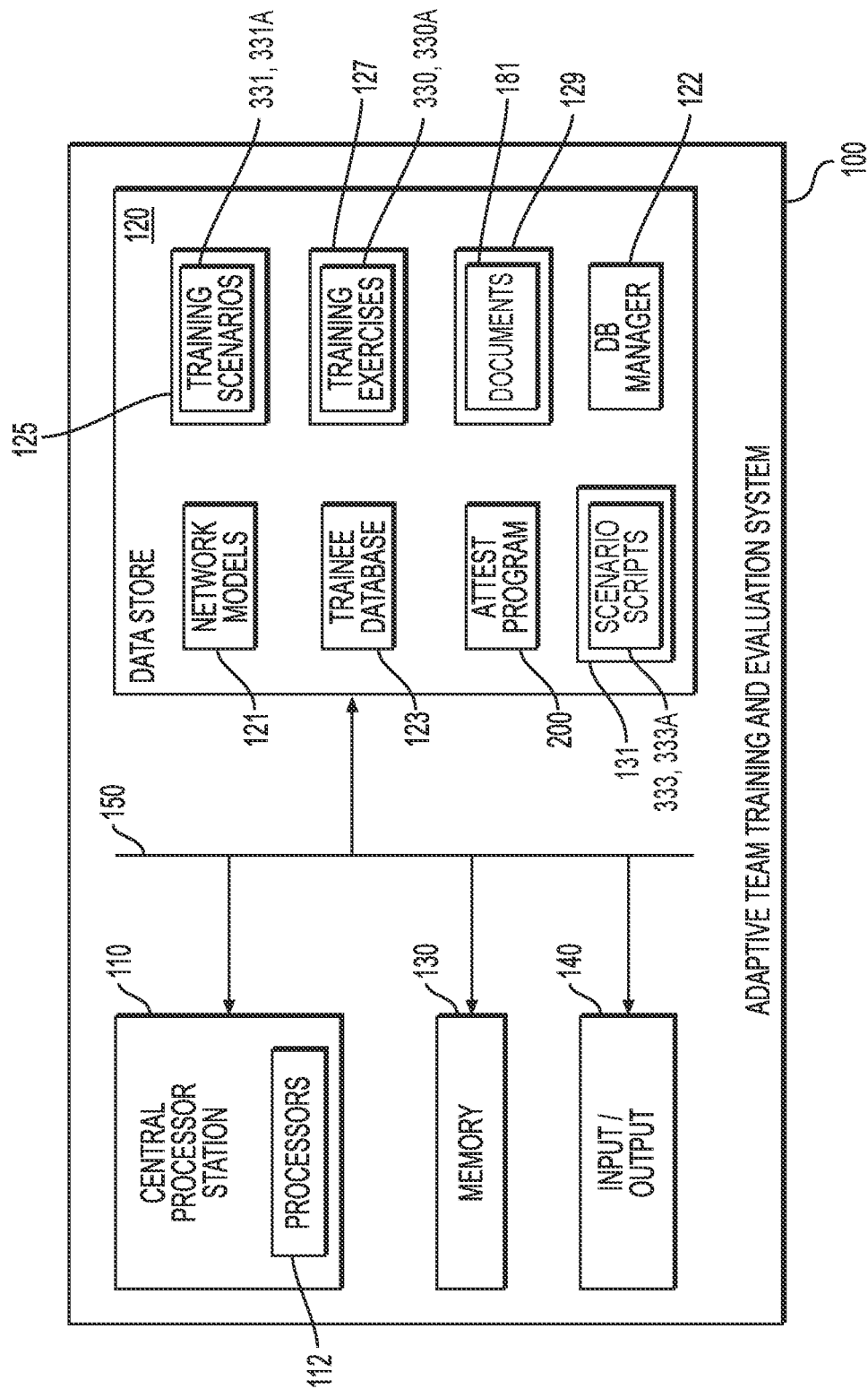

FIG. 1B illustrates an example of the ATTEST system 100 of FIG. 1A. In FIG. 1B, the example ATTEST system 100 includes a central processor station 110, data store 120, which may be, or which may include, one or more non-transitory, computer-readable storage media, memory 130, input/output component 140, and system bus 150, which connects the components of the ATTEST system 100.

The central processor station 110 may be implemented in a single location, or may be distributed in multiple locations. The central processor station 110 includes physical machines (processors 112) and other hardware. The data store 120 contains ATTEST program 200, which may be accessed by a processor of the central processor station 110, loaded into memory 130, and then executed. The data store 120 also may include network model database 121, trainee database 123, training scenario database 125, training exercise database 127, and training evaluation data and training reports database 129. The data store 120 may be controlled by database manager 122.

Figure 1C:
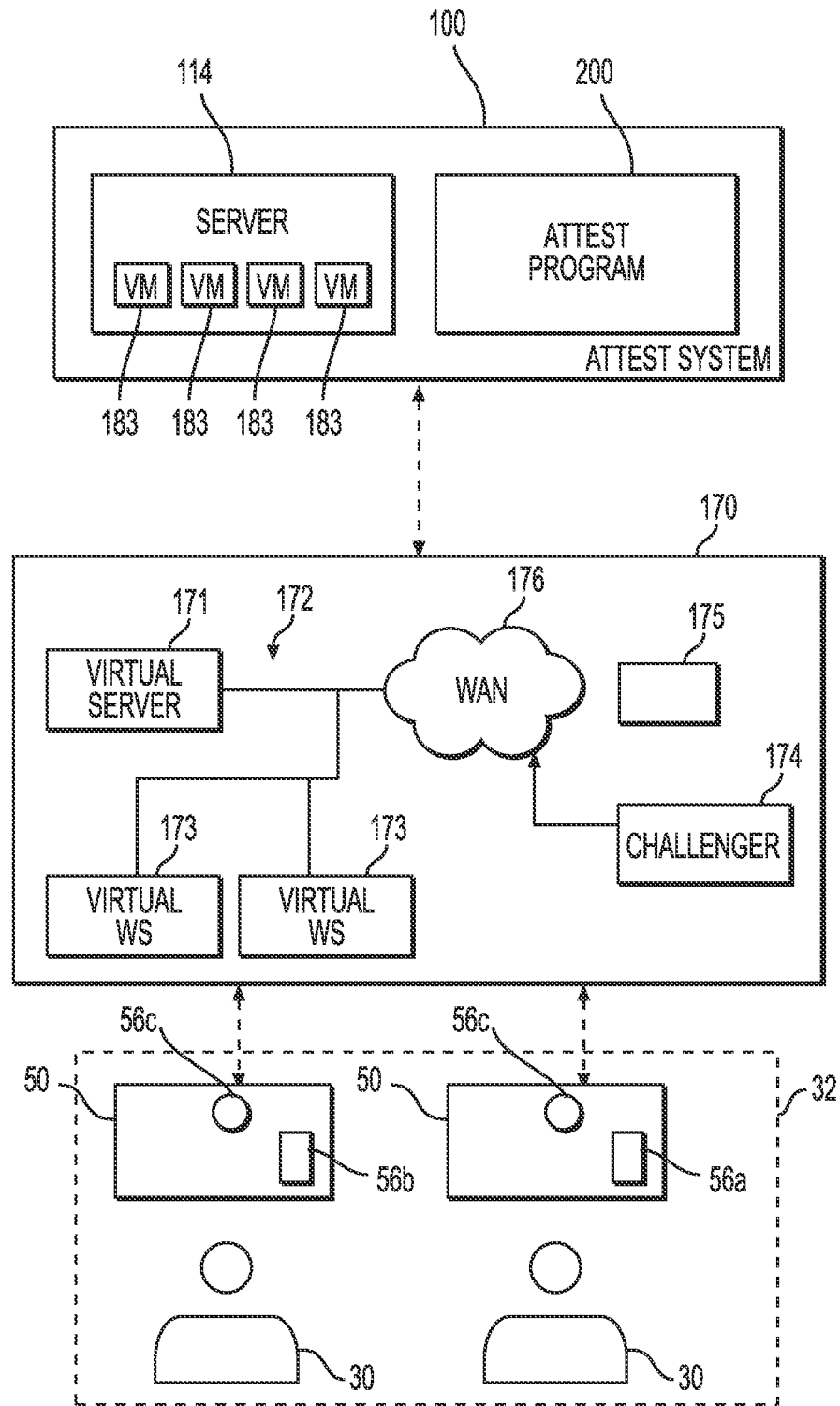

FIG. 1C illustrates an application of the ATTEST system 100 and program 200. In FIG. 1C, the ATTEST system 100 includes server 114, hosting virtual machines 183, as well as the ATTEST program 200. The ATTEST program 200 executes to implement a group training exercise for trainee group 32, which includes trainees 30. Trainees 30 operate media devices 50 to access server 114. Each media device includes native camera 56c, which captures visual images of the trainees 30, and microphones 56a, which capture voice transmissions from the trainees 30 during execution of a group training exercise 330. The ATTEST program 200 operates to create virtual machines 183 and to generate virtual training environment 170 that includes virtual network 172, which in turn includes virtual server 171 and virtual workstations 173. The ATTEST program 200 also generates challenger 174, which issues challenges 175 through virtual wide area network 176 to virtual network 172. Each challenge 175 may be implemented through one or more injectable events. The ATTEST program 200 operates to initiate execution of a group training exercise; the group training exercise includes one or more challenges 175 issued by challenger 174 to virtual network 172, each of the challenges including a pre-defined sequence of one or more injectable events. Each trainee 30 operates virtual workstations 173 through respective media devices 50 and one of the virtual machines 183. The ATTEST program 200 controls subsequent execution of the group training exercise, and evaluates performance of the trainee group 32 during the subsequent execution of the group training exercise, including directing injections of the one or more injectable events, and monitoring actions taken by the trainee group 32 in response to each of the injected events. The ATTEST program 200 operates to attribute one or more of the actions taken to one of the two trainees 30 of the trainee group 32. Finally, the program 200 executes, dynamically (i.e., in real-time) and automatically during execution of the group training exercise, a group training exercise adaptation based on the evaluated performance of the trainee group 32. In an example, the ATTEST program 200 also executes to evaluate execution of the group training exercise 330 by receiving and evaluating each of the actions taken. Evaluating each of the actions taken may include identifying a class of each of the actions taken; identifying each of the actions taken as one of a correct action, an incorrect action, and an undefined action; and assigning a positive score for each correct action and a negative score for each incorrect action. In an example, the ATTEST program 200 further operates to evaluate performance of the trainee group 32 by assessing trainee group performance after each injectable event, including, for each correct action, determining a timing of the corresponding action taken and applying a weight to the correct action. In an aspect, the ATTEST program 200 then computes an event score as a sum of the product of the weight and the positive score for each correct action and the negative score for each incorrect action; and computes a cumulative event score by summing events scores for each injected event. In an example, the ATTEST program 200 executes the group training exercise adaptation based on the cumulative event score by comparing the cumulative event score to a first threshold value and selecting a first adaptation when the cumulative event score is less than the first threshold value and comparing the cumulative event score to a second threshold value and selecting a second adaptation when the cumulative event score is greater than the second threshold value. To execute an adaptation, the ATTEST program 200 executes to stop a currently executing pre-defined sequence of injectable events and start a second pre-defined sequence of second injectable events. The ATTEST program 200 executes to attribute the actions taken by receiving a group training exercise document; the group training exercise document is indicative of an action taken; the group training exercise document may be a voice to text conversion, an image captured by camera 56c, or any other information related to an action taken. The group training exercise document is generated during execution of the group training exercise 330 (see FIG. 3A) by identifying and analyzing content data and metadata in the group training exercise document. The ATTEST program 200 then associates the group training exercise document with a specific trainee based on analysis of the content data and metadata. The ATTEST program 200 further executes to, based on the content data and the metadata, identify a specific virtual machine 183 originating the group training exercise document; acquire native sensor data associated with the specific virtual machine 183; and compare the native sensor data with reference data for each of the two trainees 30, where the native sensor data includes trainee image data and trainee voice data samples.

Figure 2A:
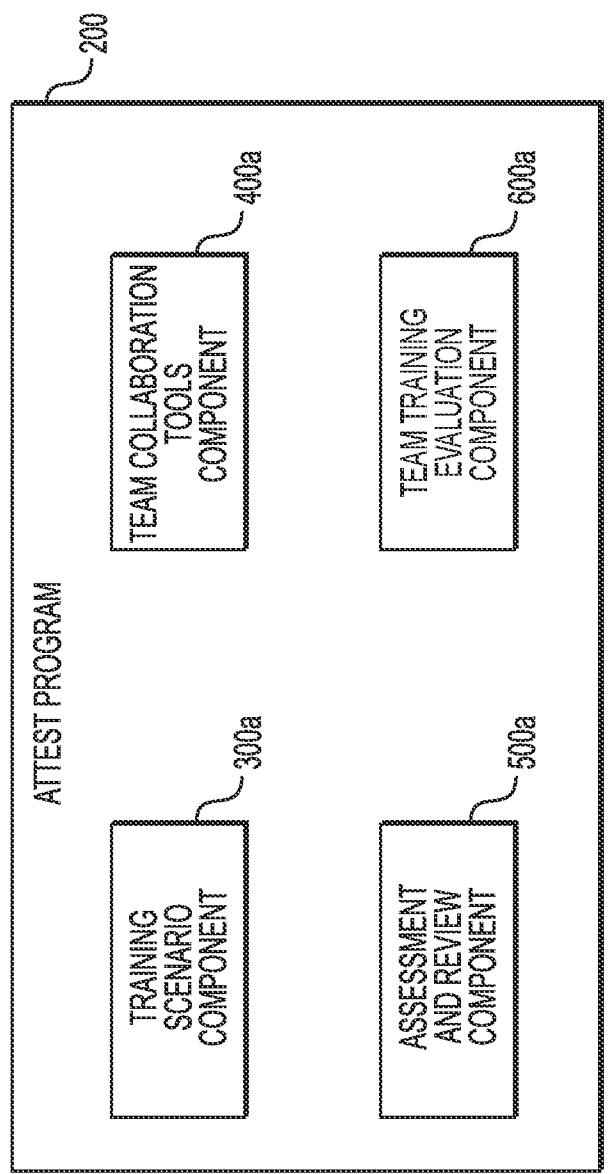
FIG. 2A illustrates an example program used in the system of FIGS. 1A and 1B.

FIG. 2A illustrates aspects of the example ATTEST program 200, which comprises machine instructions that, when executed by a processor 112 of the central processor station 110, provides an adaptive team training experience in which the performance of individual trainees 30 and the performance of trainee group 32 may be measured and evaluated. The ATTEST program 200 includes a training scenario/exercise (TSE) module 300a, a team collaboration tools (TCL) module 400a, an assessment and review (A&R) module 500a, and a team training evaluation (TTE) module 600a. These modules are shown in more detail in FIGS. 3A-6H.

Figure 2B:
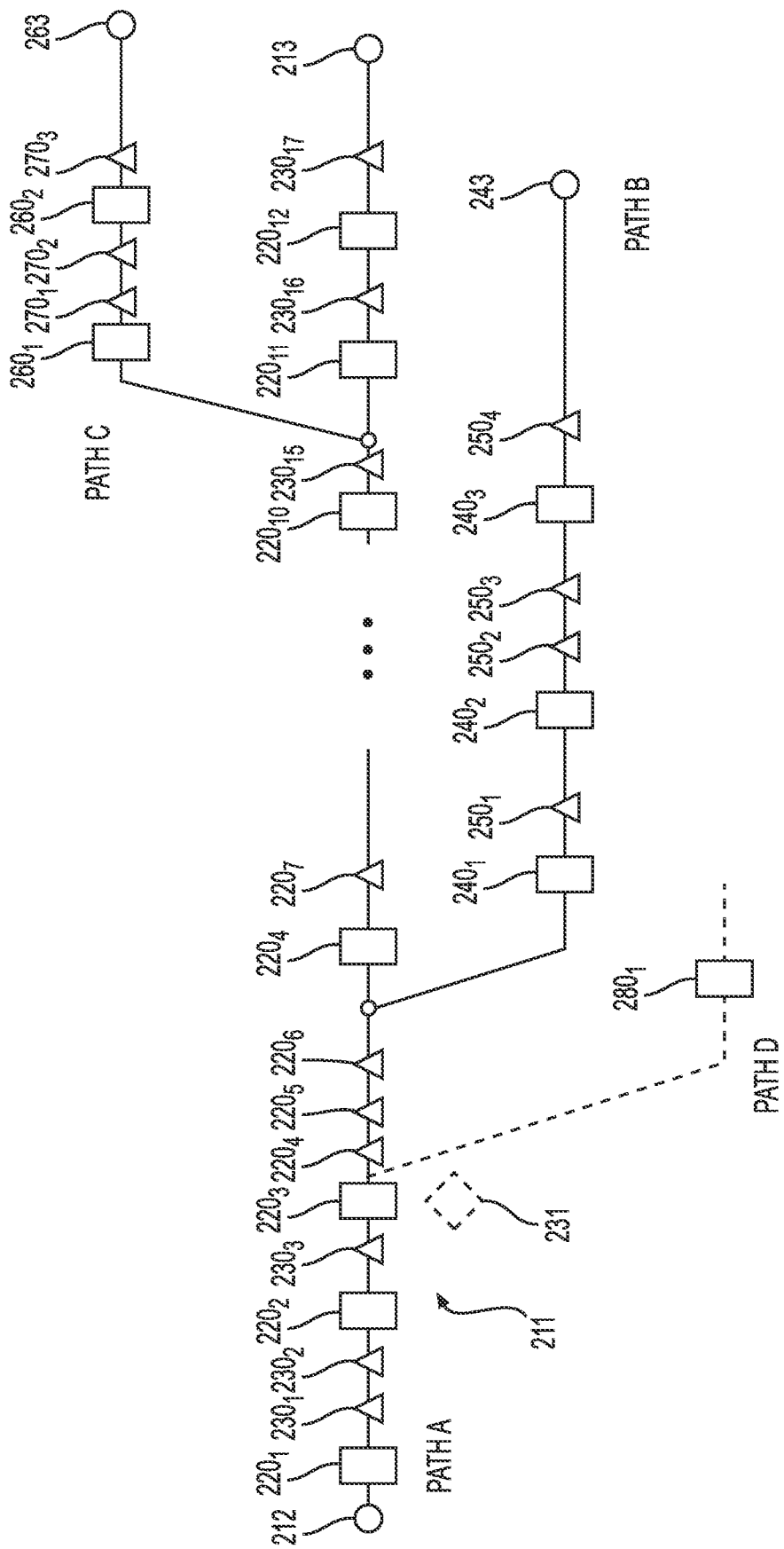
FIG. 2B illustrates an example group training exercise sequence using the program of FIG. 2A.

The ATTEST system 100 and ATTEST program 200 may be applied to different training situations or environments to define and generate adaptive team training scenarios, apply the adaptive team training scenarios as adaptive team training exercises, monitor performance of individual trainees and trainee groups, attribute specific actions (on non-actions) to individual trainees, and use the attributed actions (or non-actions) to evaluate individual trainee performance and trainee group performance. The adaptive team training scenarios and corresponding team training exercises may be automatically and dynamically adaptive in terms of training complexity and difficulty and/or in terms of training fidelity (i.e., the degree of realism of the training scenario and training exercise) at least in the sense that the corresponding team training exercise the ATTEST program 200 may execute may adapt automatically (i.e., without involvement or action by a human observer/instructor) and in real-time, or on-the-fly (i.e., during execution of the team training exercise) without need to stop or pause execution of the team training exercise. The adaptation may include changing a sequence of the executing team training exercise to add, delete, delay, speed up, or change one or more events or injections during the team training exercise. The ATTEST program 200 may execute the team training exercise adaptation based on one or more actions taken or not taken by individual trainees 30 or by the trainee group 32. Some training scenarios may involve or accommodate a variety of action types. In an example, the variety of actions types may include dynamic and non-dynamic actions. Dynamic actions may be those that can be evaluated in real-time to determine their relevance to and effect on an executing training exercise. An example of a dynamic action may be shutting down a virtual server. Non-dynamic actions may be relevant, but such a relevance determination may involve a processing delay. The processing delay may end before the end of the executing training exercise. An example of a non-dynamic action may be an email reporting a system problem. A training scenario may define expected relevant dynamic actions and relevant non-dynamic actions. All expected relevant actions may further be classified as correct actions; that is correct for the state of the system and correct for the injected event(s). Some correct actions are further designated as critical actions, depending on their effect on the executing training exercise. Still other actions may be designated as incorrect actions, considering the content of the executing training exercise and the state of the system on which the training exercise executes. Some incorrect actions may be designated as catastrophic. Incorrect, catastrophic actions may have a severe effect on the system on which the training exercise executes. A scenario developer 24 may define, as part of the training scenario development process, actions as incorrect and incorrect, catastrophic. During the execution of a training exercise, some actions may be undefinable. Resolution of undefinable actions may occur after completion of the training exercise. Finally, some actions may be irrelevant but not incorrect. Referring to FIG. 2B, a base, or reference, team training exercise 211 is defined by start point 212 and end point 213 (i.e., Path A). The base team training exercise 211 includes a number of injections $220_i$ (specifically, injections $220_1$-$220_{12}$) at which events may occur, and/or information may be presented to the trainee group 32. Following each injection $220_i$, one or more of the individual trainees is expected to take corresponding actions $230_i$. For example, following injection $220_1$, one or more of the trainees 30 is expected to take actions $230_1$ and $230_2$. The base training exercise 211 continues through injections and actions until the base team training exercise 211 ends at 213. In an aspect, the ATTEST program 200 determines which specific trainee 30 of the trainee group 32 takes each action. In an aspect, a trainee 30 may take an incorrect, or unexpected action. For example, following injection $220_3$, a trainee 30 may take incorrect (and catastrophic) action 231. During execution of the base training exercise 211, should the trainee group 32 not take one or more expected actions $230_i$ (e.g., the trainee group 32 does not take any of the actions $230_1$-$230_6$), or should the trainee group 32 take incorrect, catastrophic action 231, the ATTEST program 200 may adapt the base training exercise 211 to follow Path B, which may involve less complex and challenging injections $240_i$, ending at end point 243. If the trainee group 32 takes all or many expected actions in the base training exercise 211 up to, for example, action $230_{15}$, the ATTEST program 200 may adapt the base training exercise 211 to follow Path C, which may involve more complex and challenging injections $260_i$ than with injections $220_{11}$ and $220_{12}$, ending at end point 263. In an alternate example, if, following injection $220_3$, the trainee group 32 takes incorrect, catastrophic action 231, the ATTEST program 200 may adapt the base training exercise 211 to follow Path D, and the trainee group 32 is presented with a series of injections $280_i$ that would occur naturally as a consequence of taking the incorrect, catastrophic action 231.

In an aspect, the group training exercise 211 also is adaptive in the sense that the action taken or not taken by the trainee group 32 will affect the environment in which the group training exercise 211 executes, including any networks, components, or structures (i.e., elements) in the training environment. At the start 212 of the base training exercise 211, these elements may be defined by a starting state. After each injection or after each action, the state of an element may change. However, the state change is determined by the totality of the injections and actions taken in response. For example, if the base training exercise 211 is applied to a virtual network and if the trainee group takes incorrect and catastrophic action 231, the virtual network may be rendered inoperative. If the base training exercise 211 is applied to a medical situation involving a virtual patient, and if the trainee group takes incorrect and catastrophic action 231, the virtual patient may go into cardiac arrest (injection 280₁). In these and similar situations, the elements of the training environment then will react according to their changed state (e.g., the virtual patient dies if further prompt action is not taken). Thus, the ATTEST program 200 is adaptive in the sense that the ATTEST program 200 adapts not only the path it takes, but also changes element state and indications provided.

Figure 3A:
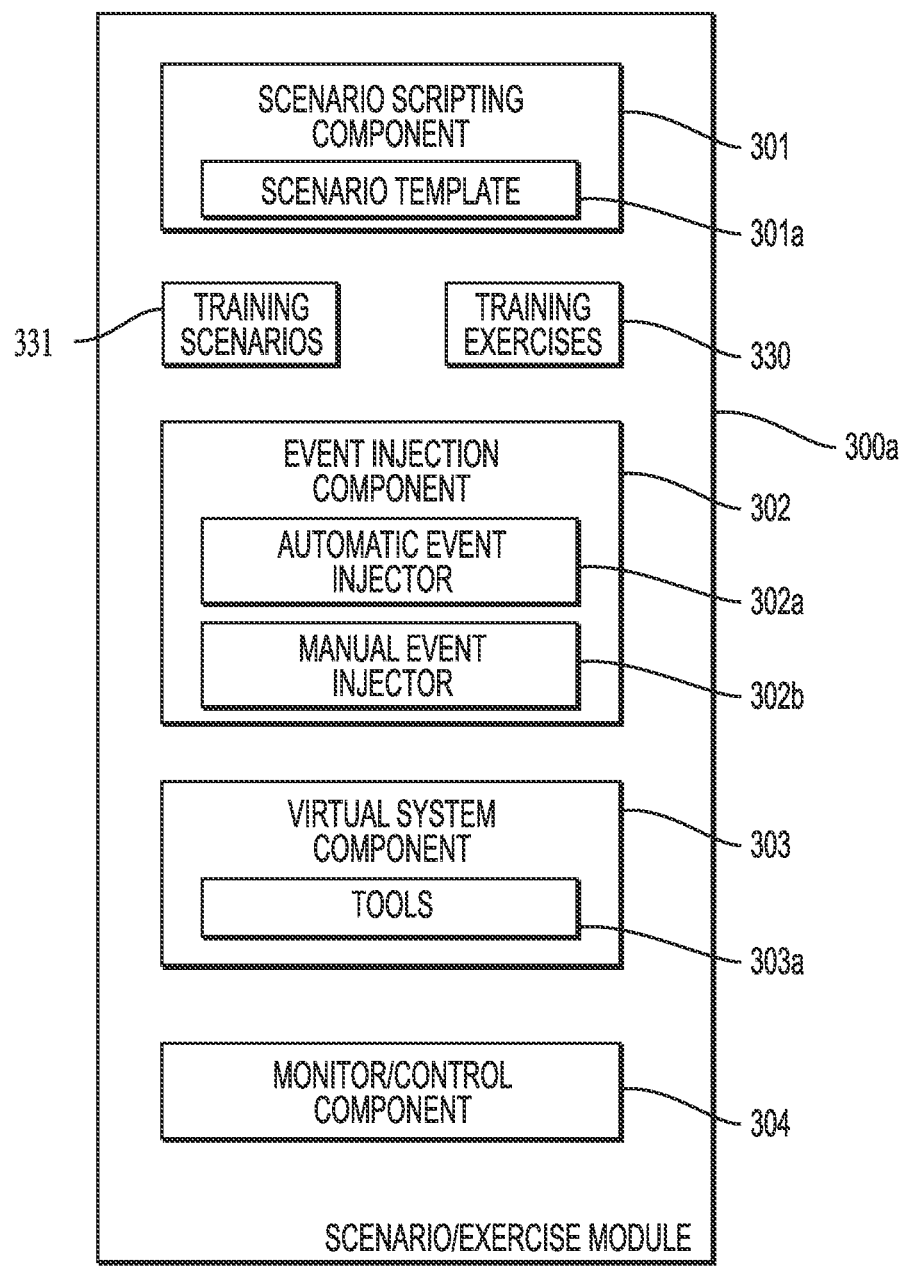

The ATTEST system 100 may be used in an advanced training and evaluation configuration to advance the state of the art of evaluating collective expertise in many different situations. A first such situation involves computer-based group training scenarios related to medical treatment of virtual patients, and the ATTEST system 100 executes to evaluate the collective expertise of an emergency response medical team. A second such situation involves cyber warfare and the ATTEST system 100 executes to evaluate collective expertise of an information technology team in cyber warfare exercises. FIG. 3A illustrates aspects of training scenario/exercise module 300a, which executes to provide one or more cyber warfare training systems or environments, and one or more training scenarios 331 and corresponding training exercises 330 associated with the cyber warfare training system or environment. In FIG. 3A, training scenario/exercise module 300a includes scenario scripting component 301, event injection component 302, virtual system component 303, and monitor/control component 304. In an aspect, some components of the module 300a execute in cooperation with corresponding components and mechanisms of the team training evaluation module 600a (see FIG. 6A). For example, during certain team training exercises 330, the modules 300a and 600a cooperate to provide some functions. For individual training exercises, more of the functions may be provided solely by the module 300a since, for example, individual trainee attribution is not an issue, and individual training exercises may be executed on-demand by an individual trainee 30 without involvement of an observer/instructor 22. In another aspect, the functions of some components, mechanisms, and devices of module 300a may be executed by similar components, mechanisms, and devices of TCL module 400a (see FIG. 4), the assessment and review module 500a, and the team training evaluation module 600a.

The scenario scripting component 301, under control of scenario developer 24, executes to generate a base training scenario script for each base cyber warfare training scenario 331, and optionally one or more adapted training scenario scripts for alternative, or adapted, training scenarios 331A. In a first example, a base training scenario 331 may be a high-fidelity scenario, and the alternative training scenarios 331A may be successively lower-fidelity training scenarios. In a second example, a base training scenario 331 may be a complex and challenging training scenario and alternative training scenarios 331A may be more complex and challenging training scenarios or less complex and challenging training scenarios. In a specific example, a base training scenario 331 may be a complex cyber warfare training scenario involving a distributed denial of service (DDoS) attack used to mask a hack of sensitive information. A first alternative training scenario 331A could be just a DDoS attack. A second alternative training scenario 331A could be a denial of service (DoS) attack. Furthermore, the alternative training scenarios 331A may comprise a branch from the base cyber warfare scenario 331 (e.g., the base training scenario 331 may proceed to an adaptation decision point, at which point, the ATTEST program 200 may execute to follow an alternate training scenario 331A). The scenario scripting component 301 also executes to generate a corresponding timeline for each training scenario 331. The scenario scripting component 301 includes scenario template 301a, which the scenario developer 24 may employ as a guide for generating a training scenario 331 and a corresponding scenario script. The scenario template 301a may include pre-defined code segments that may provide aspects of a training scenario 331. For example, the scenario template 301a may include a code segment that provides for automatic injection of an event during execution of corresponding training exercise 330. The training scenarios 331 may include what tasks the trainees 30 are expected to accomplish in response to the injected events. Each task may include one or more detectable, correct actions that may be taken by the trainees 30, and the effect such correct actions would have on the state of the system or network to which the corresponding training exercise 330 is applied. In addition, the training scenario 331 may include incorrect actions that may be taken by the trainees 30, and the affect those incorrect actions would have on the state of the system or network. Finally, in an aspect, the training scenarios 331 may include (identify) which sensors 306a (FIG. 3B) and which agents 305a and 305b are to be included in data collection and exercise monitoring during execution of a training exercise 330.

The event injection component 302 provides cyber warfare events during execution of a training exercise 330. The event injection component 302 includes automatic event injector 302a and manual event injector 302b. The automatic event injector 302a may provide a call to a library of events to inject a selected event during execution of a training exercise 330. The manual event injector 302b also may access the library of events to inject a selected event. However, the manual event injection process may be limited to events designated for manual injection by the scenario developer 24.

The virtual system component 303 executes to generate a virtual network and associated virtual elements, or other virtual structures or virtual systems, to be used during a training exercise 330. The virtual system component 303 includes tools 303a that a scenario developer 24 may employ to generate a virtual network and corresponding virtual elements/objects. The tools 303a may include drag and drop tools that allow the scenario developer 24 to easily assemble the virtual network and to configure the virtual network and its virtual elements.

Figure 3B:
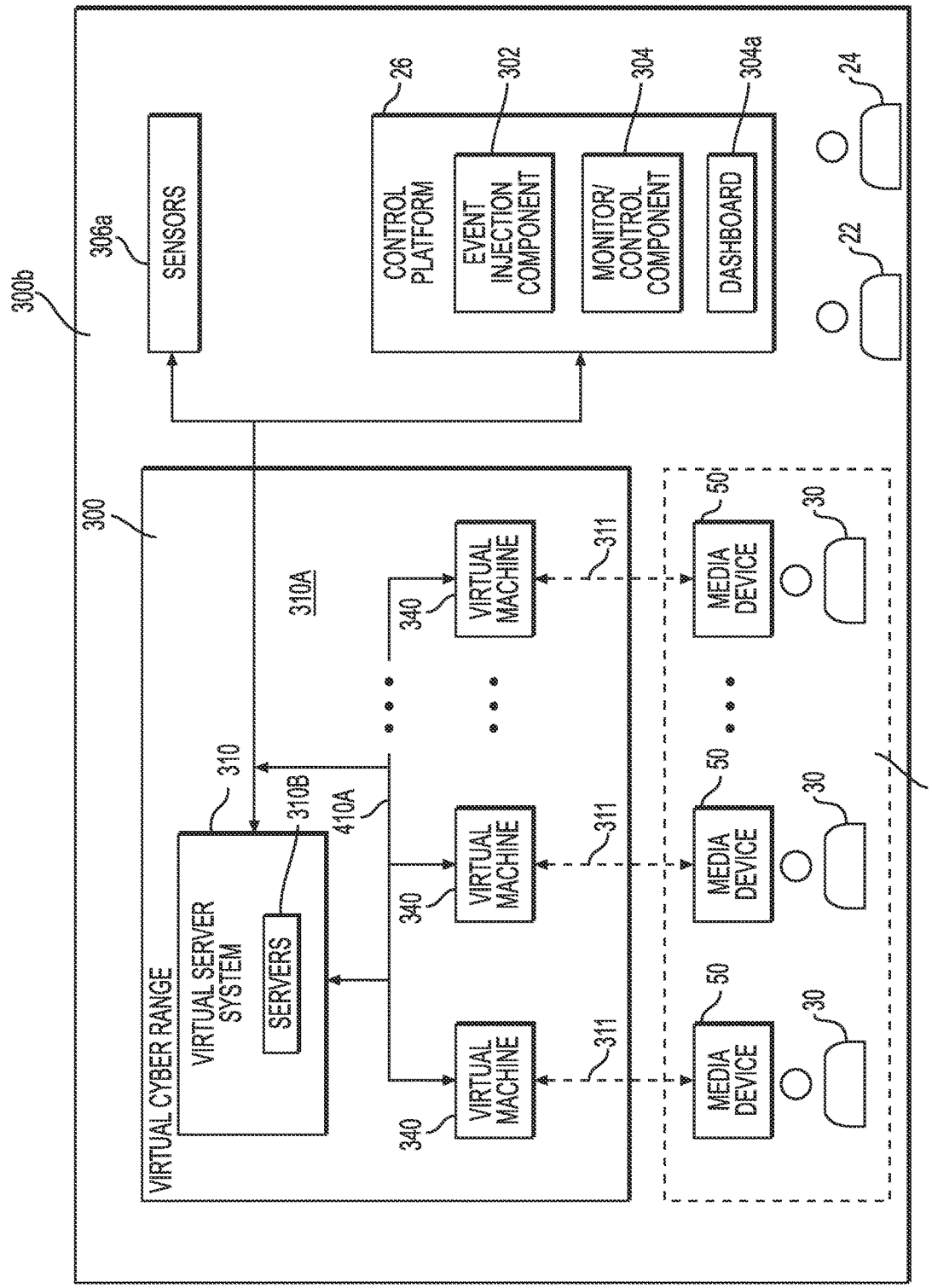
Figure 3C:
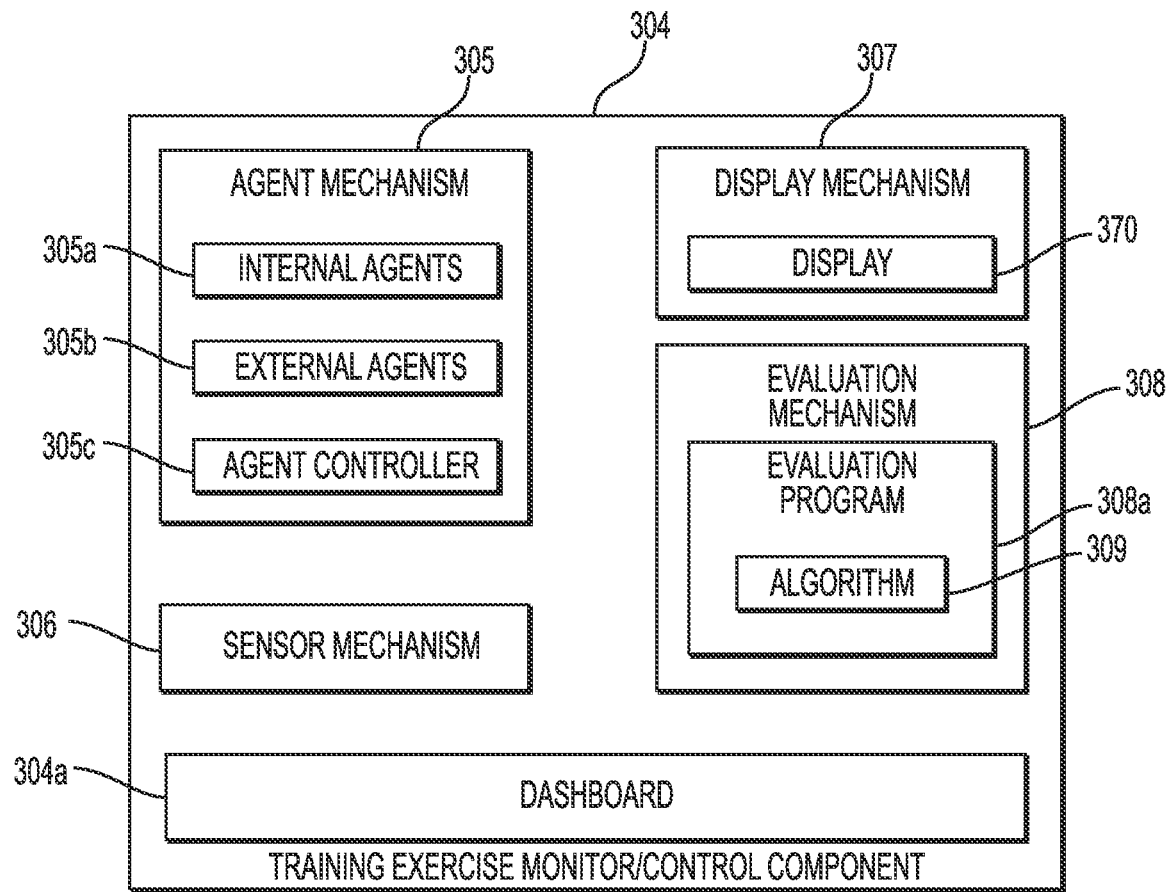

Referring to FIGS. 3B and 3C, the training exercise monitor/control component 304 includes agent mechanism 305, sensor mechanism 306, display mechanism 307, and evaluation mechanism 308. Finally, the component 304 may provide a control dashboard 304a. The dashboard 304a is described in more detail with respect to FIGS. 3D and 3E. Exercise monitor/control component 304 may operate in an automatic or semi-automatic mode. Data for the dashboard 304a and other mechanisms of the component 304 may be provided by agent mechanism 305. The component 304 may cause training exercise data and trainee progress toward learning objectives to be stored persistently in data store 120 for later review by observer/instructor 22.

The agent mechanism 305 cooperates with other modules, components, components, devices, and tools of ATTEST program 200 to provide data collected by internal agents 305a and external agents 305b for ATTEST program 200 processing operations. The agent mechanism 305 also includes agent controller 305c to control distribution of agents 305a and 305b, and data collection from the agents 305a and 305b. The agents 305a and 305b may follow a defined shared-library API, and may cover a wide range of monitoring activities.

The sensor mechanism 306, in cooperation with the agent mechanism 305, may control multiple sensors 306a used during execution of a training exercise 330 to collect data related to group and individual trainee performance. The sensors 306a include audio, visual, environmental (temperature, humidity), and motion sensors. Some sensors 306a may be incorporated into media devices 50 and may be accessed by external agents 305b. Other sensors 306a may be provided within the environment 300b (see FIG. 3B) and, if used in a specific training exercise 330, may be instrumented to provide data directly to other modules, components, mechanisms, devices, and tools of the ATTEST program 200. Some sensors 306a are trainee group sensors in the sense that these sensors acquire data from any and all trainees 30 of the trainee group 32, and may acquire data from multiple sensors 306a simultaneously. For example, a trainee group microphone may record a conversation among multiple trainees 30 during execution of a group training exercise 330, including trainees 30 "talking over" each other.

The display mechanism 307 provides a display 370 that may be used by observer/instructor 22 on computer platform 26. The display 370 is described with reference to FIGS. 3D and 3E.

The evaluation mechanism 308 may be used to provide real-time, local evaluation (e.g., at control platform 26—see FIG. 3D) of a trainee group 32 or an individual trainee 30 during execution of a training exercise 330. The evaluation mechanism 308 may provide data used for either automatic or manual adaptation of the training exercise 330 based on events injected and actions taken during the training exercise 330. The evaluation mechanism 308 may generate and display aspects of evaluation program 308a, which includes evaluation algorithm 309. The evaluation program 308a may cooperate with other components of the ATTEST program 200. In an aspect, the evaluation program 308a may receive inputs from, and provide data to, the assessment and review module 500a, and may use the inputs as part of the local evaluation of the trainee group 32 or individual trainee 30. Finally, the evaluation program 308a may cause execution of algorithm 309, whose output may be used by other elements of the ATTEST program 200 to cause an executing training exercise 330 to "adapt." The evaluation program 308a is described in more detail with reference to FIGS. 3E and 3F.

Referring to FIG. 3B, virtual cyber range 300 is generated by the training scenario module 300a from the scenario script. The virtual cyber range 300 may be locally or remotely accessed. With virtual cyber range 300, trainees 30 do not have to be physically present at the cyber range itself, and do not have to undergo training exercises at the same time. FIG. 3B shows local access using training environment 300b. The training environment 300b may include physical structures and devices such as the media devices 50, sensors 306a, control platform 26, and a cluster computing system (not shown). In an aspect, the training environment 300b may be implemented in a dedicated facility such as a room, building, or other structure. In another aspect, certain components such as the cluster computing system and one or more media devices 50 may be located remotely from other components of the training environment 300b.

In any configuration of the training environment 300b, the virtual cyber range 300 provides the capability for hands-on exercises. The virtual cyber range 300 includes virtual machines 340, virtual server system 310, which includes virtual servers 310B, and virtual network 310A. On an as-needed basis, trainees 30 may access the virtual machines 340 through a virtual network computing (VNC) connection 311, giving trainees 30 desktop access to the virtual cyber range 300 using media devices 50. In addition, the trainees 30 may communicate in a variety of modes within the context of the training exercise 330 using virtual private network 410A, which connects all the virtual elements in the cyber range 300. The virtual private network 410A is described in more detail with respect to FIG. 4.

Referring to FIGS. 3A-3C, virtual cyber range 300 is implemented on the cluster computing system (not shown) running a program of instructions (e.g., the ATTEST program 200) that provides trainees 30 with access to computer-based training exercises 330 that are hosted on the virtual machines 340. The ATTEST system 100 provides trainees 30 with applications 55 (not shown), which may be instantiated on the media devices 50 operated by the trainees 30, and which allow communication between the media devices 50 and the virtual machines 340. For group training exercises 330, certain of the virtual machines 340 may be in communication with each other (e.g., all the virtual machines 340 assigned to trainee group 32). For individual training exercises, each virtual machine 340 is isolated from other exercise virtual machines 340. Training exercises 330 may be provided on demand. Each training exercise 330 may correspond to a training scenario 331, and many instances of a single training exercise 330 may run simultaneously. The virtual cyber range 300 cooperates with other components of the ATTEST program 200 to provide fine-grained training exercise monitoring and evaluation capabilities. In an aspect, the monitoring and evaluation capabilities are implemented through use of software agents 305a deployed on the exercise virtual machines 340 and optionally, software agents 305b deployed with the applications 55, or through use of sensors 306a deployed in the environment 300b, including on the media devices 50. The control platform 26 may access evaluation program 308a that describes what tasks are to be accomplished in the training exercise 330 and how completion of those tasks may be evaluated. The training scenario/exercise module 300a then uses training exercise monitoring/control component 304 to monitor and automatically control the training exercise 330 and, in an aspect report, in real time, the trainee's or trainee group's progress. In addition, the training scenario/exercise module 300a provides a manual control feature that allows instructor/observer 22 to manually control all or part of the training exercise 330. An initial trainee's progress or evaluation report generated by evaluation program 308a may be used by observer/instructor 22 to monitor the trainee's progress, may be used in an after-action report by the observer/instructor 22 or the trainee 30, and/or may be used to programmatically determine the trainee's score for the training exercise 330. To implement the manual control feature and to monitor the trainee's progress, the observer/instructor 22 may operate control platform 26, which communicates with various physical and virtual elements within the training environment 300b. To facilitate exercise control and monitoring, as well as exercise execution, the various physical and virtual elements in environment 300b may communicate using a first communications path or channel for monitoring and control functions such as data collection by agents 305a and 305b, and for control operations such as manual event injections; and a second communications path or channel for exercise operations such as a trainee 30 taking actions to block a botnet attack.

To further illustrate aspects of the ATTEST system 100 and ATTEST program 200, an example adaptive training scenario is described with reference to FIGS. 3A-3G. The scenario is directed to a cyber warfare attack. Realism of a cyber warfare training scenario may encompass how close the scenario is to an actual cyber warfare attack, how closely the training network (e.g., virtual network 310A) corresponds to an actual physical network, including how closely the training network corresponds to the actual physical network of an organization, how closely the indications of the cyber warfare attack correspond to indications that would be observable on the actual physical network, how closely any actions taken by a trainee 30 would, if applied to an actual cyber warfare attack on the actual physical network, be reflected in the operation of the actual physical network, and other factors. The example cyber warfare training scenario 331 begins as an advanced persistent sub-saturating distributed denial of service (DDoS) attack that is used to divert attention from the real purpose of the attack, namely theft of personnel information such as passwords, bank account numbers, social security numbers, and other sensitive, and easily exploitable data by a hacker. The DDoS attack may include a SYN flood attack using one or more botnets. In normal (non-attack) situations, a host processing system, upon receiving a TCP/IP connection request (e.g., a packet with a SYN (synchronize) flag set), allocates memory resources (e.g., a backlog queue) to the request. The connection request remains "half-open" for a specified time or until a "three-way handshake" process is completed, at which point the memory resources are released. In some operating systems, this process for a single SYN request can take about three minutes. The host's processing system can handle only a defined amount of half-open connections in the backlog queue. This defined amount is controlled by the size of the backlog queue. Thus, the host processing system may include a mechanism to purge the backlog queue of half-open connection requests after the specified time. In a SYN flood attack, a malicious agent (e.g., a botnet) tries to create a large number of half-open TCP/IP connections at a host to cause the host's backlog queue to overflow, at which time the host's processing systems are overwhelmed and cannot process incoming connection requests. To increase the effectiveness of a SYN flood attack, an attacker may spoof source IP addresses of SYN packets. In this case, the host cannot finish the initialization process in a short time because the source IP addresses are unreachable. This malicious operation is called a SYN spoofing attack.

The cyber warfare training scenario 331 may be designed with a series of success-based goals: A highest success goal may include identification and prevention of the attempted theft; identification and blocking of a percentage of the DDoS components; allowance and processing of legitimate traffic; and system stabilization within a specified time. A lower success goal may include preventing the attempted theft and maintaining legitimate network traffic at 50% of capacity. A still lower success goal may be preventing the attempted theft. Failure may be allowing the attempted theft and complete flooding of the network. Using the network architecture, the intended scenario, and other data, the scenario developer 24 can establish automatic event injection points where cyber warfare attack events occur. The scenario developer 24 also may define manual event injection points. For example, if one aspect of the training exercise is to see if the trainee 30 can recognize a slowly developing botnet attack and take timely corrective action, the botnet attack may be sped-up artificially. To this end, the observer/evaluator 22 may have the option to "turn on" and "turn off" various event injections, so as to override automatic (default) event injection, or change the timing of the automatic event injections.

Turning to FIG. 3B, a SYN flood attack may be directed against virtual network 310A and one or more servers 310B of virtual server system 310 that include one or more virtual servers from a botnet (not shown—which may be simulated through control platform 26). In an aspect, the SYN flood attack may be partially implemented as a diversion for a hacker to access private, sensitive, or confidential information. The SYN flood attack begins when the botnet sends a succession of SYN (synchronize) requests to a server 310B in an attempt to consume enough server resources to make the server 310B unresponsive to legitimate traffic (e.g., traffic from client). Normally when a client attempts to start a TCP connection to a server, the client and server exchange a series of messages (the TCP handshake) which begins with the client requesting a connection by sending a SYN message to the server, followed by the server acknowledging the request by sending SYN-ACK back to the client, and finally, the client responding with an ACK, to establish the connection between the server and the client. This message sequence is standard for connections established using the TCP/IP protocol. However, in the SYN flood attack, the botnet does not respond to the server with the expected ACK code. The botnet simply may not send the expected ACK, or may spoof the source IP address in the SYN, causing the server to send the SYN-ACK to a falsified IP address—which will not send an ACK because the device at the falsified IP address did not send the original SYN. The server will wait for the acknowledgement (ACK) for a time because simple network congestion also could be the cause of the missing ACK. In a SYN flood attack, the half-open connections created by the botnet bind resources on the server and may eventually exceed the resources available on the server. At that point, the server cannot connect to any clients, which effectively denies service to legitimate clients.

During execution of the cyber warfare training exercise 330, the ATTEST program 200 may provide a local display of representations of the cyber warfare attack. Turning to FIG. 3D, display 370a presents three such representations: an interactive visual representation 371 of the scenario script, a training exercise timeline 373, and a trainee action display 375. The interactive visual representation 371 is based on, and generated from, a scenario script prepared by the scenario developer 24. The interactive visual representation 371 is interactive in that it includes a number of points (labeled in FIG. 3D as A, B, C, D, D', and D"), where an event injection may occur and/or where the training scenario 331 may adapt in response to actions taken by the trainees 30 during execution of a corresponding training exercise 330. In the example SYN flood attack, the expected events follow line A-B-C-D, where Event A may be an increase in delay responding to SYN messages, and which may eventually result in shutdown of server 310B (Event B). After Event A, trainees 30 may notice the effects of the SYN flood attack and may take some action in response. At event B, the indications are such that the trainees 30 should understand that at least a DoS attack is occurring, and should take corrective action to mitigate its consequences. However, the trainee's actions may cause a split in the flow of the training exercise (that is, the training exercise 330 may adapt automatically to another path). For example, after Event B, the trainees 30 could take a first course of action, and the interactive visual representation 371 proceeds to point C. In a first alternative, the trainees 30 could take a second course of action, and the interactive visual representation 371 proceeds to Event D'. In a second alternative, the trainees could take a third course of action, and the interactive visual representation proceeds to Event D". Timeline 373 indicates actual clock time as the training exercise 330 progresses, including projected and then actual clock time for each Event A, B, C, D (e.g., $t_A$, $t_B$, etc.). Timeline 373 also includes points where the trainees 30 may be expected to take a specific action or actions. For example, timeline 373 may include points a and b, where more perceptive trainees 30 would be expected to take actions. The trainee action display 375 records actual times at which the trainees 30 take actions in response to events shown in interactive visual representation 371. In an aspect, pop up window 377 may display actions taken by the trainees 30 at each recorded point along the trainee action display 375. In an example, certain events on the interactive visual representation 371 may be moved, or shifted in time, by the observer/instructor 22. In an aspect, the observer/instructor 22 may move an event, such as Event A or Event B to an earlier time, and some event movements may result in a change in the training exercise progression. In an aspect, the pop-up window 378 associated with an event may display optional, training exercise paths that may be selected manually by the observer/instructor 22. Other events may be moved or deleted automatically, thereby changing the training exercise 330. Still other events may be substituted for automatically, thereby changing the training exercise 330. Movement, deletion, and substitution of events in the interactive visual representation 371 may occur automatically based on the trainees' actions or non-actions. For example, if the trainees 30 fail to take any action in the face of sufficient indications of a SYN flood attack (e.g., at or after Event B), a less subtle (and perhaps not totally realistic) version of the attack may be presented to the trainees 30 (e.g., to Events D' or D").

In FIG. 3D, the SYN flood attack scenario 331 may provide a variable, timed sequence of SYN attack indications, and the scenario 331 may have associated with it one or more of these indications, and one or more actions expected from the trainees 30. For example, at point B (Event B) in the interactive visual representation 371, the trainees 30 may be provided with an indication that HTTP service is down for the server 310*b*. If the trainees 30 were to check, the trainees 30 would find the backlog queue at a max count condition. The trainees 30 would be expected to check SSH performance, check for a max counts reading from a server monitor, restart the server 310*b*, and determine if the server monitor quickly reaches its max count limit. Next, the trainees 30 should check the number of TCP connection requests in a SYN_RECV state. A large number would be unusual, and may indicate a DoS or DDoS attack. The checks are expected actions from the trainees 30. However, the trainees 30 may take further actions to mitigate the attack. One such action is to notify an IT supervisor (if appropriate), which can be done by email, text message, or telephone. Another action is to try to block the attack. The trainees 30 may identify the incoming IP addresses and write a script to block the IP addresses (e.g., block IP addresses with more than 20 half-open connections). However, this last action may not be effective. The trainees 30 then may try to harden the TCP/IP stack by changing default values of stack variables (e.g., decreasing the time of keeping a pending connection in the SYN_RECV state by decreasing the number of packet retransmissions or turning off packet retransmissions entirely). The trainees 30 should recognize that the botnet can counter these actions by sending a larger number of SYN requests; however, the actions may allow legitimate traffic to the server 310*b*. As the SYN flood (and hack) continue, the trainees 30 would be presented with additional indications and would be expected to take additional actions.

Referring to FIGS. 3A and 3D, event injection component 301 and training exercise monitor/control component 304 include elements that provide automatic and manual control of training exercises 330. The elements include automatic event injector 302*a* and manual event injector 302*b*. The automatic event injector 302*a* may be triggered at the event points (e.g., Event A) shown in the interactive visual representation 371. The manual event injector 302*b* allows the observer/instructor 22 to accelerate, delay, delete, or substitute injection of events during execution of the training exercise 330. However, the observer/instructor 22 may only substitute events designated by the scenario developer 24. In an aspect, the manual event injector 302*b* also allows the observer/instructor 22 to add events, designated as optional events, by the scenario developer 24. However, addition of events may be limited to specific time blocks in the interactive visual representation 371, or before or after a specified event.

Referring to FIGS. 3C and 3E, evaluation mechanism 308 allows construction and display of a training exercise evaluation tree. The exercise evaluation tree may be static and may represent the scenario developer's design for event injection, corresponding indications, and possible trainee actions and their outcomes. For the example training scenario involving a DDoS attack implemented as a SYN flood attack, which is a diversion for an identity theft attack aimed at securing passwords, bank accounts, and social security numbers for a financial institution's customers, FIG. 3E illustrates a segment of exercise evaluation tree 390, which begins with a botnet attack intended to slow down, (and optionally, eventually stop) network traffic into and out of the servers 310B. A DDoS attack may be difficult to identify at least because an organization's Web site(s) may be down due to legitimate traffic, rather than an attack. One way to tell the difference lies in the length of time the HTTP service is down or sluggish—if slow or denied service continues for days rather than a spike during a campaign, a DDoS attack likely is underway. However, one cannot simply check to see if all of the traffic is coming from one IP address, as this is the purpose of a DDoS: to have traffic coming from multiple sources. In addition, an organization may have implemented some technology upgrades that allow an IT person (represented by a trainee 30) to know the network's normal behavior and may help point to any abnormal incidents such as a DDoS. The evaluation tree 390 is based on the example virtual network 310A of FIG. 3B. The evaluation tree 390 begins at inception of the training exercise 330 with attack initiation and with the virtual network 310A at state 0. At 391, Event A is injected—an increase in resource demand on one of the servers 310B which may be manifested in HTTP server logs. In response, the trainee 30 can do nothing (391A), relax firewall bandwidth limits (391B), or take initial actions to counter a possible DDoS or DoS attack including, maintaining bandwidth rules, monitoring bandwidth trends, notifying the organization's security personnel, and identifying IP address and geographical locations of sending platforms, where possible (391C). Because 391C is the correct action, the trainee 30 is given a high event score (see FIG. 3F), and the state of the virtual network 310*a* remains as at its initial state, since no changes were made.

If the trainee 30 chooses 391B, the state of the virtual network 310A changes to state 1, with the server 310B capable of accommodating more traffic than at state 0. Note that since the attack is a sub-saturating DDoS attack, the attackers want to keep some network traffic possible so that the hacker may steal identity information through a gateway, but want enough of an increase to alert IT personnel that a DDoS attack is underway. If the trainee 30 does nothing (391A), the training exercise 330 may automatically adapt (for example, to increase the rate at which the botnet attack occurs). After 391A, 391B or 391C, with the virtual network 310A at state 1 or state 0, the evaluation tree 390 moves to 392, and the botnet attack increases, indicated by loss of HTTP service (Event B) on one of the servers 310B. In response, the trainee 30 may do nothing (392A), may restrict access of certain IP addresses (392B), or may increase the queue of half-open connections (i.e., in the SYN-RCVD state), decrease the time for keeping a pending connection in the SYN-RCVD state, and act to identify and block specific IP addresses (392C). Assuming the trainee 30 takes the action 392C, the evaluation tree 390 moves to 393 and the trainee 30 is presented with an indication of an attempted hack and theft of data from one of the servers 310B. Thus, the evaluation tree 390 may progress through a number of injections, responses (good or bad), state changes, and adaptation decision points. As noted, the adaptation decision points, when reached, may generate an automatic adaptation to the training exercise 330; in an aspect, the observer/instructor 22 may override the adaptation decision points, or may invoke an adaptation decision point at an earlier point in time.

Figure 3F:
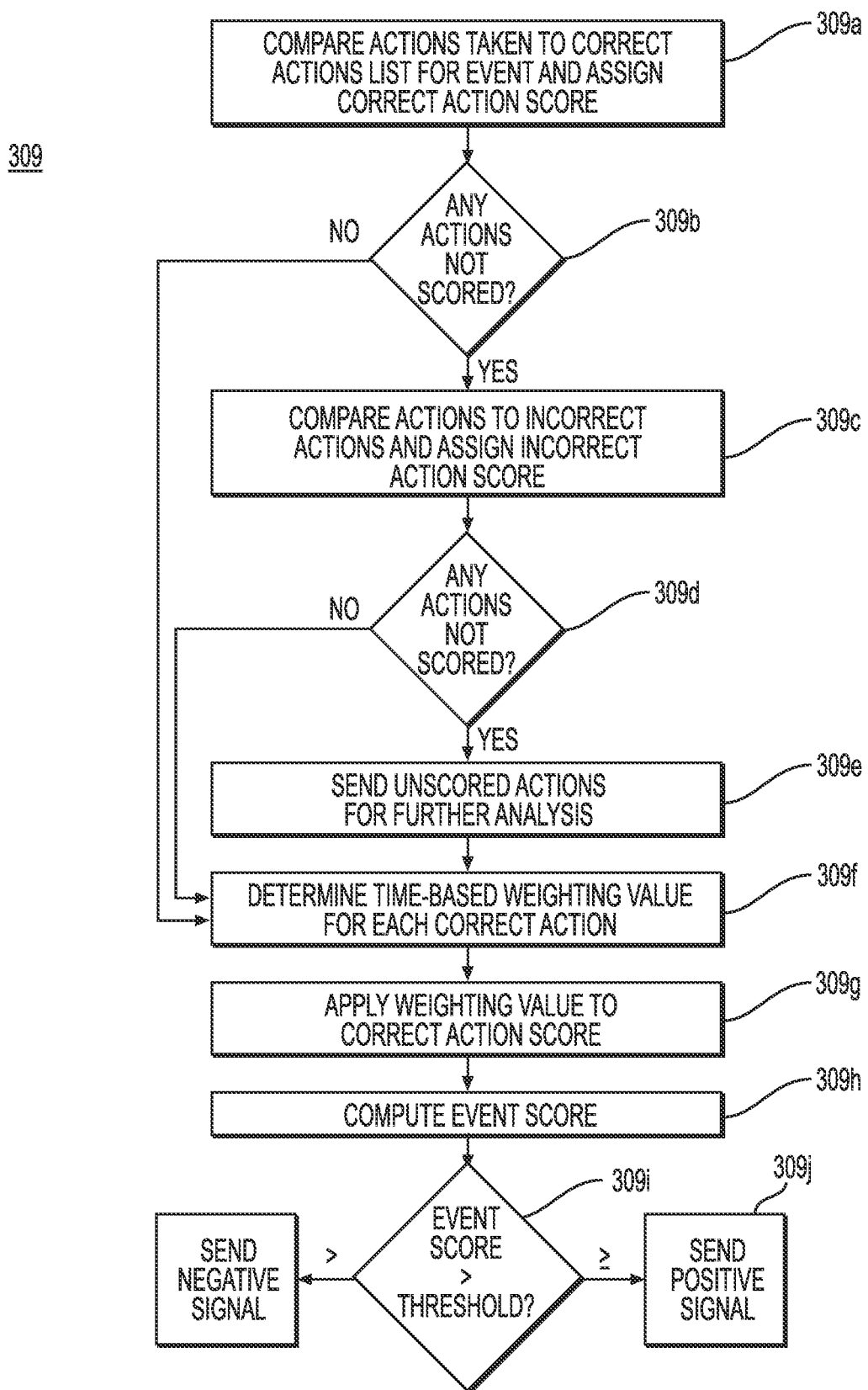

FIG. 3F illustrates an example of evaluation program 308a. In FIG. 3F, evaluation program 308a includes evaluation algorithm 309. Evaluation algorithm 309 executes to compute a score at one or more decision points (including at an adaptation decision point) during execution of a training exercise 330. Based on the score, the evaluation algorithm 309 further provides a signal that may be used to automatically adapt (change) the executing training exercise 330, or to suggest to observer/evaluator 22 to manually adapt the executing training exercise 330. The algorithm 309 begins in block 309a by comparing actions taken in response to an event (for ease of description, Event B) to a pre-defined continuum (from minimal to critical) of correct actions and assigning a score based on the number and value of the actions taken compare to the continuum of correct actions. As an example, if the continuum of correct actions includes actions 1-5 and the trainees 30 take all five actions, the algorithm 309 assigns a score 1.0. If only one correct action is taken, the algorithm 309 assigns a score of 0.5. In an aspect of block 309a, the continuum of correct actions includes only those actions that may be identified in real-time as correct actions. Following block 309a, the algorithm 309 determines if any actions remain undefined following the process of block 309a. In block 309b, if any actions remain undefined, the algorithm 309 moves to block 309c. In block 309c, the algorithm 309 identifies any undefined actions as incorrect actions by comparison to a pre-defined continuum of incorrect, from minimal incorrect to incorrect, catastrophic actions, and assigns a negative score from −0.2 to −1.0 based on the severity of the incorrect action (from minimal to catastrophic). In block 309b, if no undefined actions remain, the algorithm 309 moves to block 309f. Following block 309c, the algorithm determines, block 309d, if any undefined actions remain. In block 309d, if any undefined actions remain, the algorithm 309 moves to block 309e. Otherwise, the algorithm 309 moves to block 309f. In block 309e, the algorithm 309 sends the unidentified action to other elements of the ATTEST program 200 for further, non-real-time processing to identify the action as correct or incorrect. In block 309f, the algorithm 309 determines a weighting value to apply to the correct action score based on the timeliness of the correct actions, from a maximum weight of 1.5 to a minimum weight of 0.75. In block 309f, the algorithm 309 applies the weight to the correct action score. In block 309g, the algorithm 309 computes a total event score (for Event B) by: Event Score=(Correct Action Score)×Weight−Incorrect Action Score. In block 309h, the algorithm 309 compares the Event Score to an adjustable threshold. If the Event Score is greater than or equal to the adjustable threshold, the algorithm 309 provides, in block 309i, a positive signal to the monitor/control component 304 and the executing training exercise 330 continues. If the Event Score is less than the adjustable threshold, the algorithm 309 provides, in block 309j, a negative signal to the monitor/control component 304 and other elements of the ATTEST program 200, and the executing training exercise 330 automatically adapts in one or more aspects as defined by the scenario developer 24. In an aspect, the output of the algorithm 309 may be provided to the team training exercise module 600a, where the output is a factor used to determine if an executing training exercise 330 is to be "adapted." Alternately, the negative signal provides a prompt to the observer/instructor 22 to consider adapting the executing training exercise 330 according to pre-defined aspects generated by the scenario developer 24.

Figure 3G:
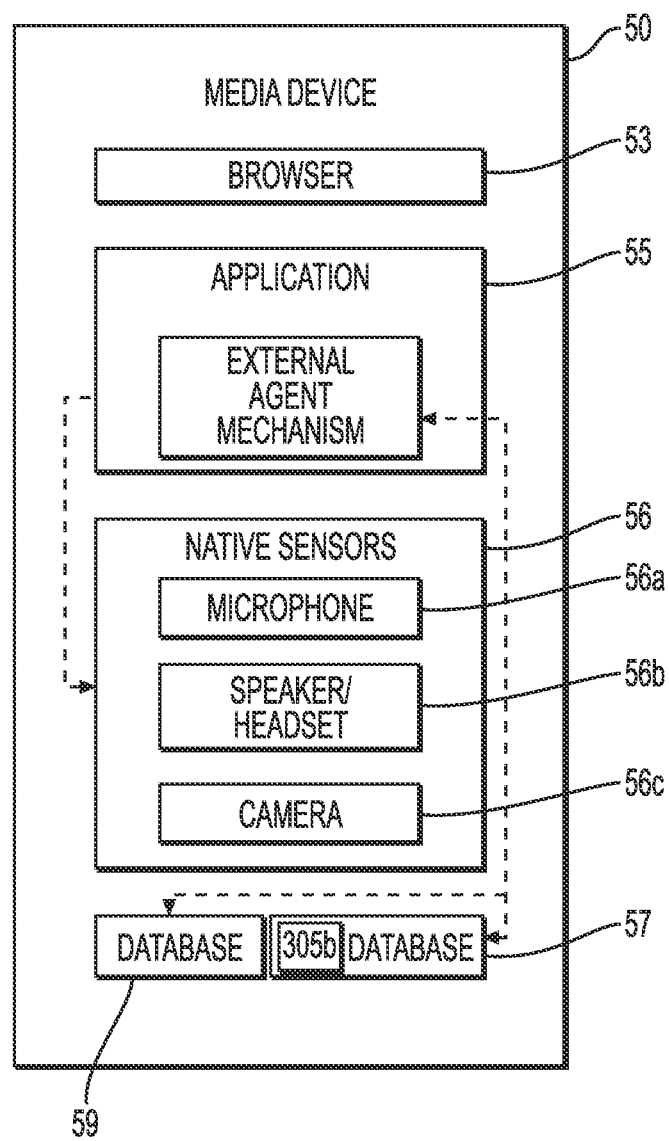

FIG. 3G illustrates an example media device 50 configured to operate in the environment 300b of FIG. 3B. In FIG. 3G, media device 50 includes application 55. The application 55 provides the media device 50 with a communication component to communicate with elements of the virtual cyber range 300, including virtual machines 340 and server 310B. The application 55 also includes mechanisms for one or more external agents 305b to extract data from sensors 56 native to the media device 50, such as a microphone 56a, a speaker/headset 56b, and a camera 56c. The media device 50 also includes database 57 in which may be stored the one or more external agents 305b and database 59 in which data from the native sensors 56 and the one or more external agents 305b are stored. As implemented on the media device 50, the external agents 305a may collect keystroke information, cursor movement information, text presented as a document, trainee login data, communication connections with any virtual machine 340, voice communications over the microphone 56a and the speaker/headset 56b, eye tracking data of the trainee 30 and facial recognition data of the trainee 30 from the camera 56c, and other data. The capture, processing, and analysis of the data are described in more detail with respect to other elements of the ATTEST program 200.

Figure 4:
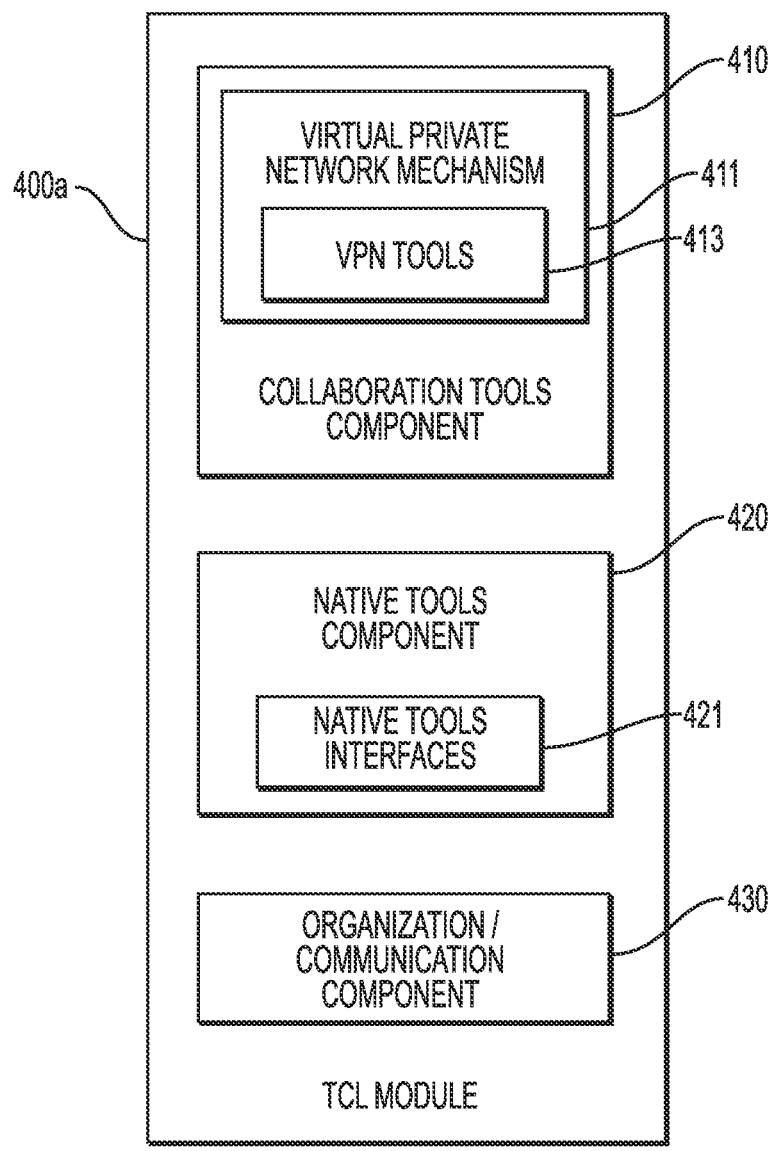
FIGS. 4-6H illustrate additional modules, components, mechanisms, devices, and tools of the program of FIG. 2A.

FIG. 4 illustrates an example of the Team Collaboration Tools (TCL) module 400a. The TCL module 400a executes in cooperation with other modules of the ATTEST program 200 to provide trainees 30 with collaboration tools to facilitate successful execution of a team training exercise 330. The TCL module 400a also is used to establish the trainee group organization and to allow the trainees 30 to plan a response to the training exercise 330. The TCL module 400a enables observers/instructors 22 to define a trainee group's structure or let the trainees 30 self-organize.

In FIG. 4, TCL module 400a includes collaboration tools component 410, native tools component 420, and organization/communication component 430. The collaboration tools component 410 may include elements that are accessed by the media devices 50 through VPN tools mechanism 413. In an aspect, the elements are included with the application 55 provided to the media devices 50. In another aspect, the elements are instantiated on the virtual machines 340 and are accessed by the media devices 50. In yet another aspect, the elements are controlled through a self-hosted virtual private network (VPN) 410A (see FIG. 3B) established within the virtual network 310A (see FIG. 3B) as part of the training exercise 330. The VPN tools include text and voice chat rooms, SMS (text) messaging, video calling, searchable chat history, and file storage though the virtual machines 340. The native tools component 420 provides native tool interfaces 421 to elements native to the media devices 50. The interfaces 421 allow the trainees 30 to share information directly from and among the media devices 50. For example, the interfaces 421 allow the trainees 30 to send and receive emails and text messages, and share documents and reports through a native document manager outside the virtual cyber range 300. However, because the VPN 410A provides robust communications devices, the trainee group 32 may conduct many inter-group communications through the virtual machines 340. The organization/communication component 430 allows the trainees 30 to organize a trainee group 32, and assign roles and tasks external to the virtual machines 340. Depending of the training exercise 330 to be executed, the trainee group organization may not occur until after the training exercise 330 begins.

Figure 5:
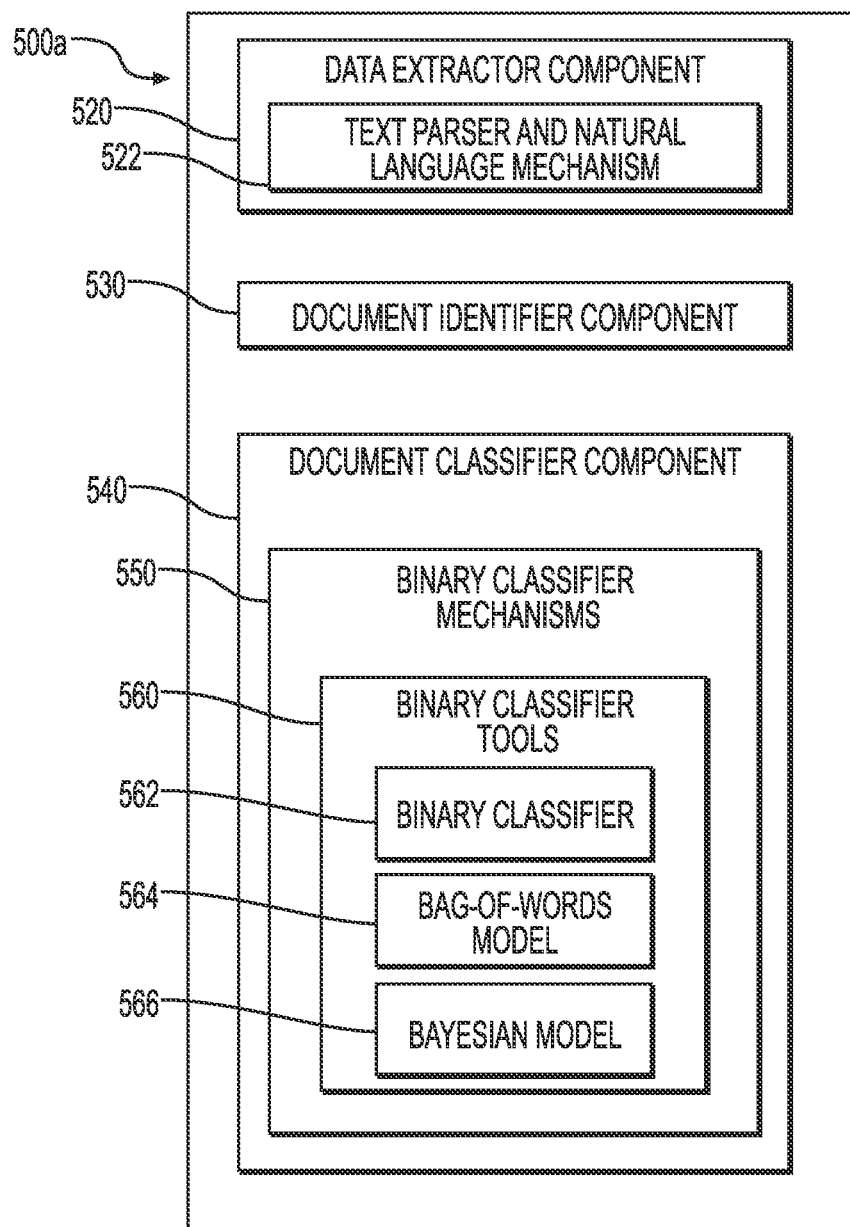

FIG. 5 illustrates an example Assessment and Review (A&R) module 500a. The A&R module 500a uses data from the Team Collaboration Tools (TCL) module 400a and the Team Training Evaluation (TTE) module 600a. The A&R module 500a processes and analyzes that data, primarily for non-real-time (e.g., post training exercise) training exercise evaluation, and based on the analysis results, may provide feedback to the TTE module 600a and other components of the ATTEST program 200 for adjusting the training scenario 331 and adapting the training exercise 330. As described herein, the TTE module 600a and other components of the ATTEST program 200 may use the feedback to adapt an executing training exercise 330 and/or adjust a corresponding training scenario 331. The A&R module 500a may use adaptive learning algorithms to tailor training scenarios 331 to individual trainee and trainee group skill levels. The A&R module 500a supports trainee group and individual trainee performance assessments by incorporating the results of the trainee group as a whole, as well as individual trainee participation and actions, trainee group communications, and individual trainee experience/history.

The A&R module 500a includes data extractor component 520, which in turn includes text parser and natural language device 522. The A&R module 500a further includes document identifier component 530 and text classifier component 540, which in turn includes binary classifier mechanism 550.

The test parser and natural language component 522 includes an effective natural language processing tool that can quickly parse and tokenize text. One such tool is spaCy, described at https://spacy.io/. SpaCy is an open-source library that performs fast and accurate natural language processing. Using spaCy, the data extractor component 520 may parse and tokenize the text of a document. SpaCy also may determine the part of speech of each tokenized word or phrase. Knowing the part of speech may help identify potential collaboration and attribution processes. For example, a verb may mean that trainee A will perform the action represented by the verb as a part of a training exercise 330. The nouns surrounding the verb may help identify which training exercise tasks the trainees are working on. SpaCy also is capable of detecting and recognizing phrases instead of just single words separated by spaces. For example, spaCy may recognize the phrase "SYN flood" as a single token, instead of recognizing two tokens "SYN" and "flood". SpaCy also is capable of entity recognition. This means that spaCy may recognize when pronouns in text refer to a specific subject somewhere else in the text.

The document identifier component 530 and the document classifier component 540 cooperate to identify and classify a document. The document identifier component 530 may identify a document class though analysis of data within the document and/or metadata associated with the document. For example, an email may be identified as such based on an email header, including to and from data, and subject line data. The email also may be identified as such by metadata such as send and receive date and time metadata. To support a classification by document content aspect of the document classifier component 540, the document identifier component 530 identifies and segregates documents by type because subsequent classification and textual analysis of the document may be strongly affected by the document's format and data usage. For example, trainees 30 communicate in varying fashions depending on the mode of communication (i.e., the "document"), and verbal communications are less structured than text messaging because the trainee 30 sending the email cannot be interrupted by another trainee 30. On the one hand, a sending trainee 30 has the ability to take time to think about the content of an email before sending it. Text messages on the other hand, often are very short and sometimes contain shortened versions of words or acronyms. Therefore, the document classifier component 540 provides differing tools for each document class.

The document classifier component 540 classifies a document according to the document's textual content. In an aspect, the document classifier component 540 includes binary classifier mechanism 550 that applies tools according to a class within which the document falls, as determined by the document identifier component 530. Binary classifier mechanism 550 includes multiple binary classifier tools 560. Each binary classifier tool 560 includes a binary classifier 562, a bag-of-words model 564, and a Bayesian model 566. Multiple binary classifier tools 560 are used to classify documents as relevant or not based on the documents' contents. For example, the documents may fall into one of four document classes: reports, emails, text messages, and voice to text conversions. Thus, to account for the wide variety of data usage and text formatting in these documents, a first binary tool applies to reports, a second to emails, a third to text messages (e.g., instant messenger (IM)), and a fourth for voice to text conversions. The binary tools then execute to classify a document as relevant to the executing training exercise or not. As noted, each binary classifier tool includes a unique bag-of-words model suited to the expected content of documents to which the binary classifier tool is applied.

Application of the bag-of-words model 564 may begin with generating two lists, or "bags," each containing certain phrases that may be found in a document. One bag contains words found in documents that likely would be used or generated in a specific training scenario 331; that is, documents relevant to the training scenario 331. A second bag contains words found in documents that would not be relevant to the training scenario 331. For example, a relevant email generated during a DDoS training scenario 331 may include the word 'flood."

The binary tools mechanism then applies a Bayesian model 566 to determine if a document is relevant based on word counts developed through execution of the bag-of-words model 564. In an example where a document is classified as an email, application of the bag-of-words model 564 results in the word "flood" occurring with some frequency. The Bayesian model 566 then is applied to determine the probability that the email is relevant (R) give the occurrence of flood (F) in the email. The Bayesian formulation is:

$$P(R|F)=P(F|R) \times P(R)/[P(F|R) \times P(R)+P(F|NR) \times P(NR)],$$

where
- P(R|F) is the probability that the email is relevant given the email contains flood (F).
- P(R) is the probability the email is relevant; this probability value is derived from historical data related to emails in DDoS SYN flood attacks.
- P(F|R) is the probability that flood occurs in the email given the email is relevant; this probability value is derived from historical data related to emails in DDoS SYN flood attacks.
- P(NR) is the probability that the email is not relevant; this probability value is derived from historical data related to emails in DDoS SYN flood attacks.
- P(F|NR) is the probability the email contains flood given the email is not relevant; this probability value is derived from historical data related to emails in DDoS SYN flood attacks.

If the posterior probability P(R|F) is sufficiently high, the document classifier component 540 designates the document as relevant.

The document classifier component 540 also may cooperate with the document identifier component 530 to identify, and subsequently classify a document as relevant based on analysis of certain header data and certain metadata. For example, the document identifier component 530 may identify a document as an email based on data or metadata such as an email address. The document classifier component 540 then may classify the email as relevant based the email's data and metadata.

In either situation, the document classifier component 540 and the document identifier component 530 cooperate to determine if a document is relevant or not. In some situations, the components 530 and 540 may be unable to establish (or unable to establish with sufficient probability) that a document is relevant. In this situation, the document may be marked as undetermined. Following the relevance determination, the relevant and unidentified documents are provided to other components of the A&R module 500a. In addition, the relevant and unidentified documents may be stored in database 129.

FIGS. 6A-6H illustrate an example of the Team Training Exercise (TTE) module 600a. The TTE module 600a may cooperate with other components of the ATTEST program 200 to provide exercise monitoring, attribution, and evaluation. In an aspect, the module 600a executes to attribute actions and events to individual trainees 30 of a trainee group.

Figure 6A:
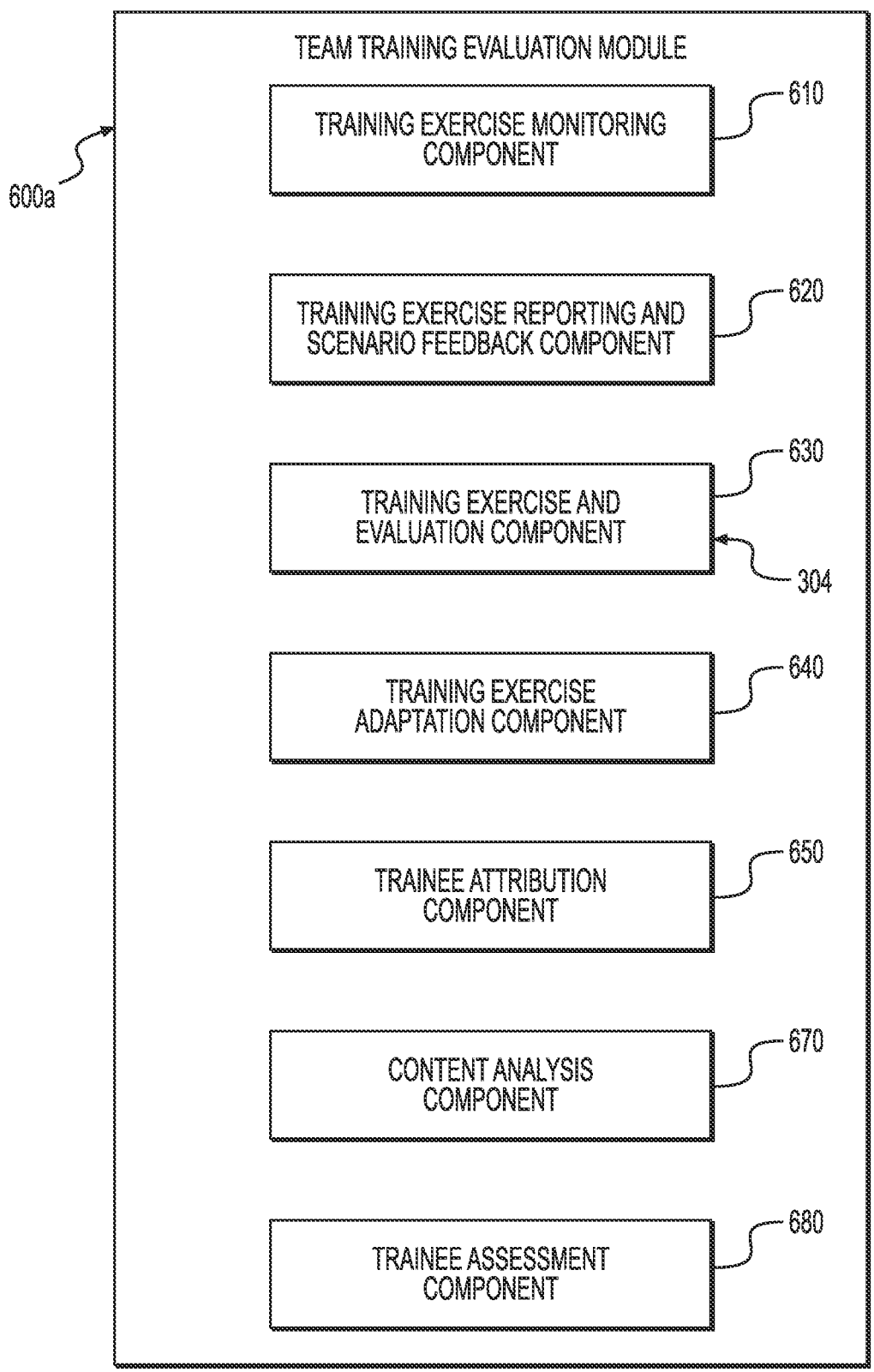

In FIG. 6A, TTE module 600a includes training exercise monitoring component 610, training exercise reporting and training scenario feedback component 620, training exercise control and evaluation component 630, training exercise adaptation component 640, trainee attribution component 650, content analysis component 670, and trainee assessment component 680.

Referring generally to FIGS. 6B-6H, and with reference to the example environment 300b of FIG. 3B, as disclosed herein, the training exercise monitoring component 610 cooperates with other elements of the ATTEST program 200, including the training exercise monitoring/control component 304, to receive training exercise data from elements such as agents 305a and 305b, and in some aspects, receive data directly from sensors, such as sensors 306a, installed in the training environment 300b. Such data may be processed or raw data. The component 610 processes the raw data, and provides processed data to monitoring elements such as the dashboard 304a (FIG. 3D) and to other components of the team training exercise module 600a. The training exercise reporting and scenario feedback component 620 reports completed exercise information to, for example, observer/instructor 22, and saves the reports in database 129. The component 620 also includes automated and manual feedback mechanisms that a scenario developer 24 may use to improve existing training scenarios 331, to generate training scenario adaptations, and to create new training scenarios. The training exercise control and evaluation component 630 receives outputs of algorithm 309 and executes additional evaluation processes. The component 630 also includes mechanisms that execute to provide instructional content in the form of training exercises 330 (which are derived from training scenarios 331) to individual trainees 30 and trainee group 32. The component 630 includes automatic and manual mechanisms to ensure an executing training exercise 330 follows its intended path as specified in the corresponding training scenario 331. To enable automatic, on-the-fly adaptation of an executing training exercise 330, the component 630 cooperates with adaptation component 640 to alter the instructional content, namely, to automatically and dynamically (on-the-fly) adapt the training exercise 330 by, for example, adding, deleting, changing, or delaying an event, or by imposing "structural" changes to the virtual network 310A. The adaptation component 640 determines how, and by what means, the training exercise 330 may and/or should be automatically and dynamically adapted. Certain aspects of trainee and trainee group performance is determined dynamically (that is, in real time during execution of a training exercise 330) through algorithm 309 (FIG. 3F). Other aspects of trainee and trainee group performance are determined dynamically and in real-time and/or after completion of an executing training exercise 330 by monitoring mechanisms of the adaptation component 640 in cooperation with mechanisms of the training exercise monitoring component 610, the training exercise control and evaluation component 630, and the trainee assessment component 680. The mechanisms include devices such as software agents (agents 305a and 305b) and listeners that acquire data and information from elements of a trainee's media device 50 during execution of a training exercise 330 and from sensors native to the media device 50 (e.g., camera 56c) or directly from other sensors 306a in the training environment 300b. The thus-collected real-time data are processed by trainee assessment component 680 in conjunction with other data accessible to the component 680. In an example, the other data accessible to the component 680 includes perceptual data 681, trainee and trainee group profile data 682, historic trainee action data 683, and environmental data 684, all of which may be stored in database 129 under control of data manger 122 and some of which may be obtained before execution of the training exercise 330 (e.g., historical data) and some of which may be obtained during or after execution of the training exercise 330.

Figure 6B:
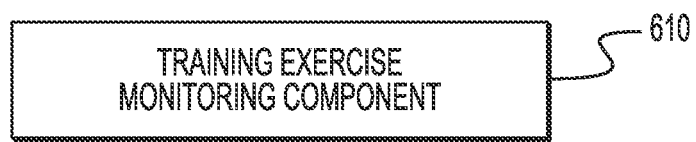

Turning to FIG. 6B, the training exercise monitoring component 610 cooperates with elements of the module 300a to receive data from agents 305a and 305b for both real-time monitoring and long-term evaluation of trainees 30 and trainee group 32 during execution of individual and group training exercises 330. More specifically, the component 610 may receive agent-collected data, including certain sensor data, from monitor/control component 304 and other sensor data directly from sensors 306a. The training exercise monitoring component 610 also cooperates with elements of trainee attribution component 650 to determine individual trainee contributions to a team training exercise 330. The training exercise monitoring component 610 may operate in an automatic or semi-automatic mode. The component 610 may provide planning and evaluation dashboards to observer/instructor 22. The component 610 may cause data and trainee progress toward learning objectives to be stored persistently for later review by observer/instructor 22 and for use by elements of the training exercise reporting and scenario feedback component 620 and the trainee assessment component 680.

Figure 6C:
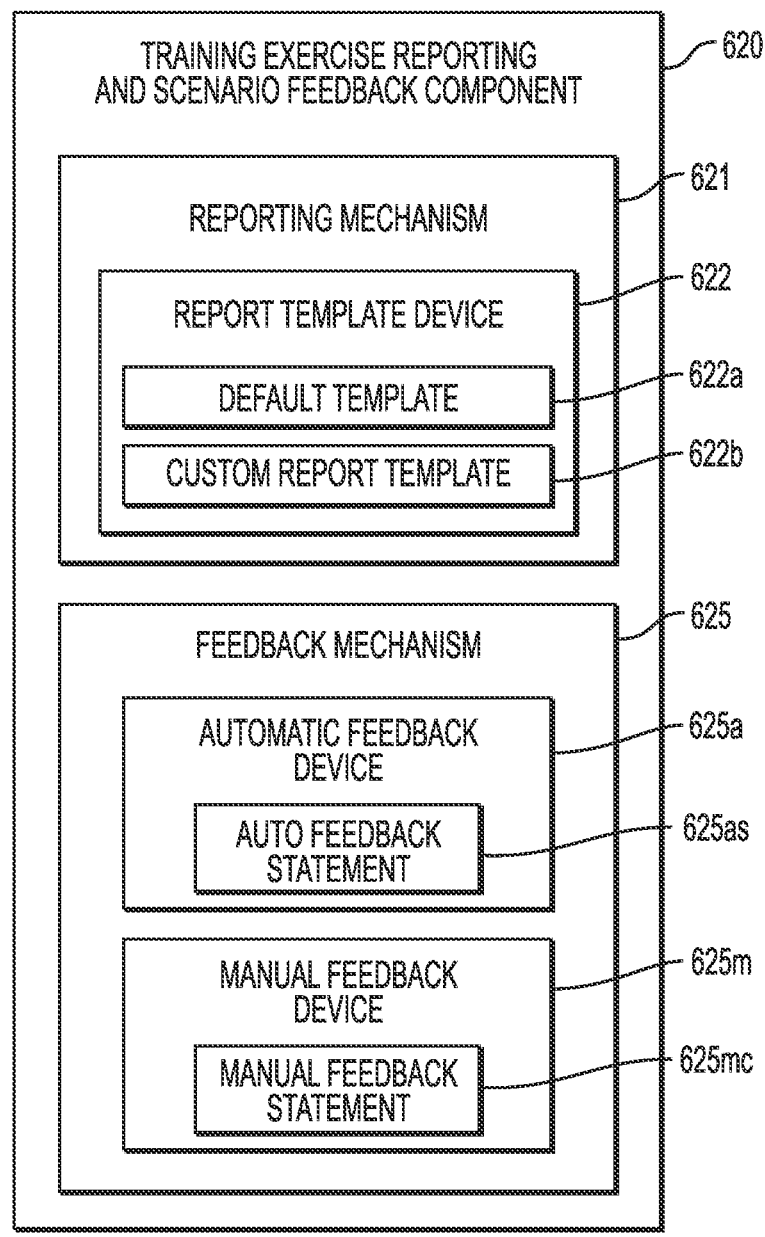

The training exercise reporting and scenario feedback component 620, shown in FIG. 6C, includes reporting mechanism 621 and scenario feedback mechanism 625. The reporting mechanism 621 cooperates with other modules, components, mechanisms, device, and tools (e.g., elements) of the ATTEST program 200 to collect, format, and store results of training exercises 330 in reports database 129 of data store 120, and to display the results of completed training exercises 330. The reporting mechanism 621 provides a report template device 622 that allows observer/instructor 22 to generate and distribute a report of one training exercise 330 or a plurality of training exercises 330. The report template device 622 includes default report template 622a and custom report template 622b. The custom report template 622b allows the observer/instructor 22 to use a drag and drop operation whereby data field descriptors from the reports database 129 are selected by the operator/instructor 22 to generate a custom report. For example, the reports database 129 may include as data field descriptors, trainee_name and date_of training_exercise, and the observer/instructor 22 may generate a custom report with just these two data field descriptors to list in the custom report, all trainees 30 and the date the trainees 30 completed any training exercise 330. Furthermore, the observer/instructor 22 may save the custom report in the reports database as a report template with links back to locations in database 129 in which the data were stored, and may use the report template to provide subsequent updated reports using the same data field descriptors.

The scenario feedback mechanism 625 provides automatic feedback device 625a and manual feedback device 625m. The automatic feedback device 625a may provide an automatic feedback statement 625 as to the scenario developer 24 for each completed training exercise 330. In an aspect, the statement 625 as may be provided only for training exercises 330 that involved an adaptation step, or for a training exercise 330 that was completed with a perfect or near perfect score. The former condition may indicate a training exercise 330 that was too complex, or whose indications were too obtuse; the later condition may indicate a training exercise 330 that was not sufficiently challenging. The manual feedback device 625m allows the scenario developer 24 to generate, in advance of execution of a training exercise 330, a custom feedback statement 625mc (which also may be completed by a trainee 30 or an observer/instructor 22) that will provide the scenario developer 24 specific data from the completed training exercise 330 (i.e., the custom feedback statement 625mc auto-populates during and at the conclusion of a designated training exercise 330).

Figure 6D:
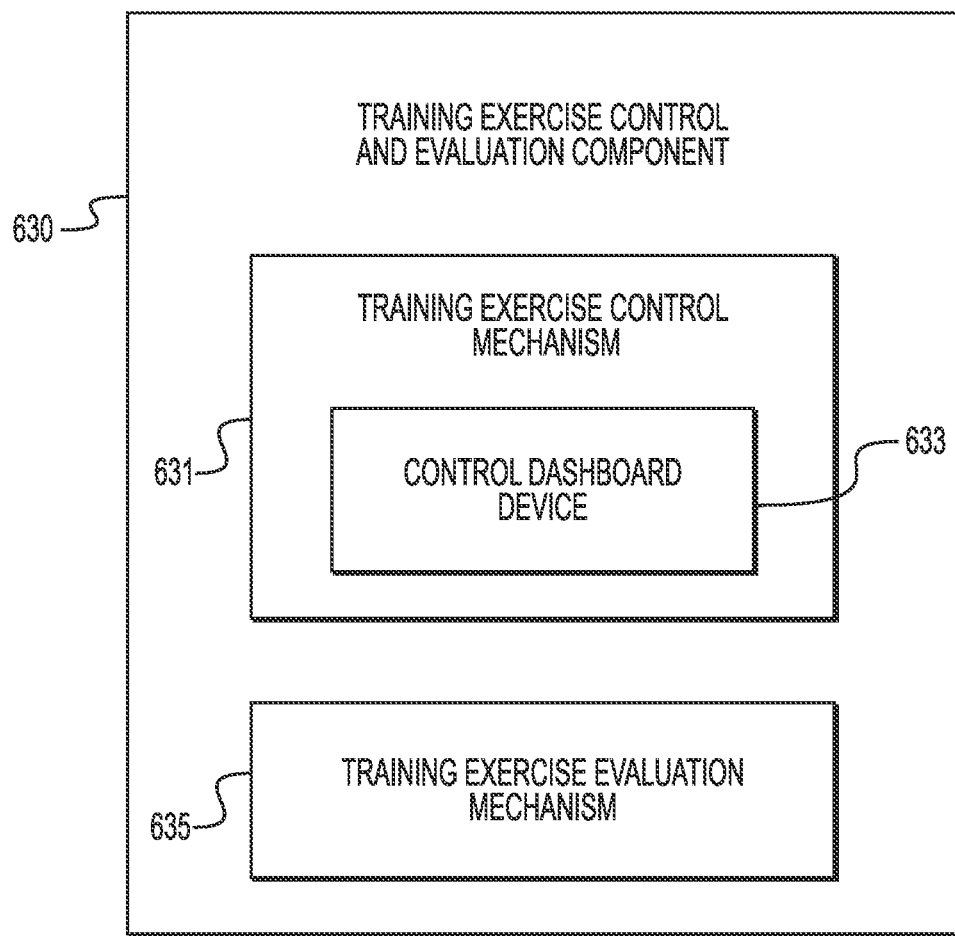

The training exercise control and evaluation component 630, shown in FIG. 6D, provides training control mechanism 631, which may be used in cooperation with training exercise monitor/control component 304 to control a training exercise 330; and training evaluation mechanism 635, which may be used to evaluate an executing or completed training exercise 330. The control mechanism 631 may provide control dashboard device 633, which in turn may provide, or may cooperate with monitor/control component 304 to provide a dashboard that an operator/instructor 22 may use to exert manual control over aspects of a training exercise 330. An example dashboard is dashboard 304a shown in FIG. 3D. Through operation of dashboard 304a, the control mechanism 631 may cooperate with event injection component 302 to manually inject events during execution of a training exercise 330. For example, an observer/instructor 22 may operate an element on dashboard 304a, which generates a signal to training exercise control mechanism 631, which executes to confirm the manual injection, and signal manual injector 302b to inject the selected event. In addition, the operator/instructor 22 may use the dashboard 304a to speed up, slow down, pause or end a training exercise 330. Take, for example, the training scenario involving a DDoS attack implemented as a SYN flood attack, which is a diversion for an identity theft attack aimed at securing passwords, bank accounts, and social security numbers for a financial institution's customers. The observer/instructor 22 may manually delay injection of Event B (HTTP server shutdown) during execution of the corresponding training exercise 330 to provide the trainee group 32 more time to identify and respond to Event A (abnormal increase in HTTP server access messages).

The exercise evaluation mechanism 635 includes other devices to direct agents differently depending on whether the agent is to be deployed internally (agent 305a) or externally (agent 305b).

Figure 6E:
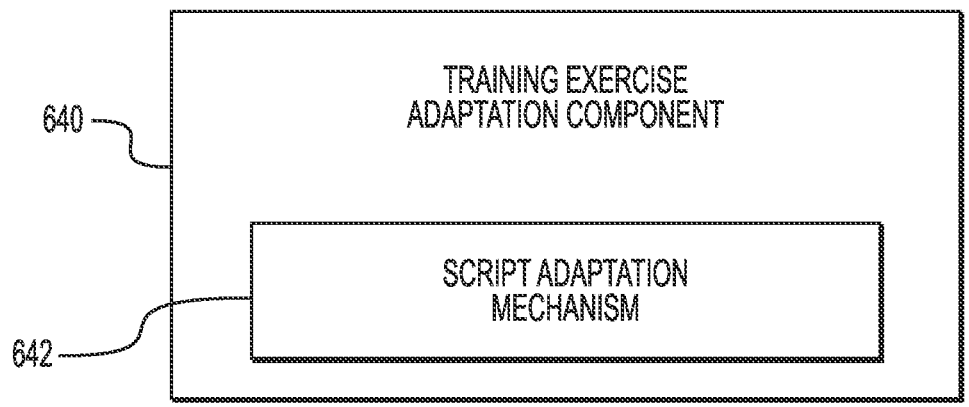

The training exercise adaption component 640, shown in FIG. 6E, includes mechanisms that allow for automatic or manual adaptation of an executing training exercise 330. One such mechanism is script adaptation mechanism 642, which may define alternate or adapted event sequences (i.e., an adapted script for adapted training scenario 331A) that differ from those of a base training scenario 331. The adapted event sequences, when selected, may result in a less complex and challenging training exercise 330 than would generate from the base training scenario 331. However, some adapted event sequences may simply use alternate, but equally challenging, events. The adapted script(s) may be generated by the scenario developer 24 during initial development of the base training scenario 331 or in response to feedback from completed training exercises 330. The adapted scripts may define an adaptation decision point in the scenario script for the base training scenario 331 at which the adapted script may be implemented. In an automatic mode, the adaptation component 640 may cause implementation of the adapted script 333A during execution of a training exercise 330 based on a running event score such as that generated by example algorithm 309 (see FIG. 3F). For example, in an exercise directed to defending a Web server from a denial of service attack, the base training exercise 330 may involve a large number of attackers from an apparently wide variety of IP subnets making Web requests, similar to a botnet-based distributed denial of service attack. At an adaptation decision point, the executing base training exercise 330 may adapt automatically to a less complex and challenging denial of service attack based on the running Event Score or other metric.

The ATTEST program 200 incorporates trainee attribution features for group training exercises. The trainee attribution features allow attribution on and among media devices 50 and virtual machines 340 in environment 300b; in addition, the trainee attribution features allow attribution of actions taken by trainees 30 in the environment 300b that do not involve actions taken on a computing device. In an aspect, the trainee attribution features associate actions across multiple computing devices by multiple trainees and associate asynchronous actions (and events) with specific trainees 30 and specific training exercises 330. Such attribution is beneficial, since many computer processes, such as file changes, run without recording of user credentials. Thus, if a trainee 30 modifies the file "config.txt", a program receiving the modification "knows" only that "config.txt" was modified. As is discussed herein, such file changes, and other application change processes, may be traced to the trainee 30 making the changes to the device (physical or virtual) on which the changes were made. In an example, a shell program or a tracing program may be used to record trace information during execution of a training exercise 330 session, or may be used to modify event-reporting components to include additional trainee information.

Figure 6F:
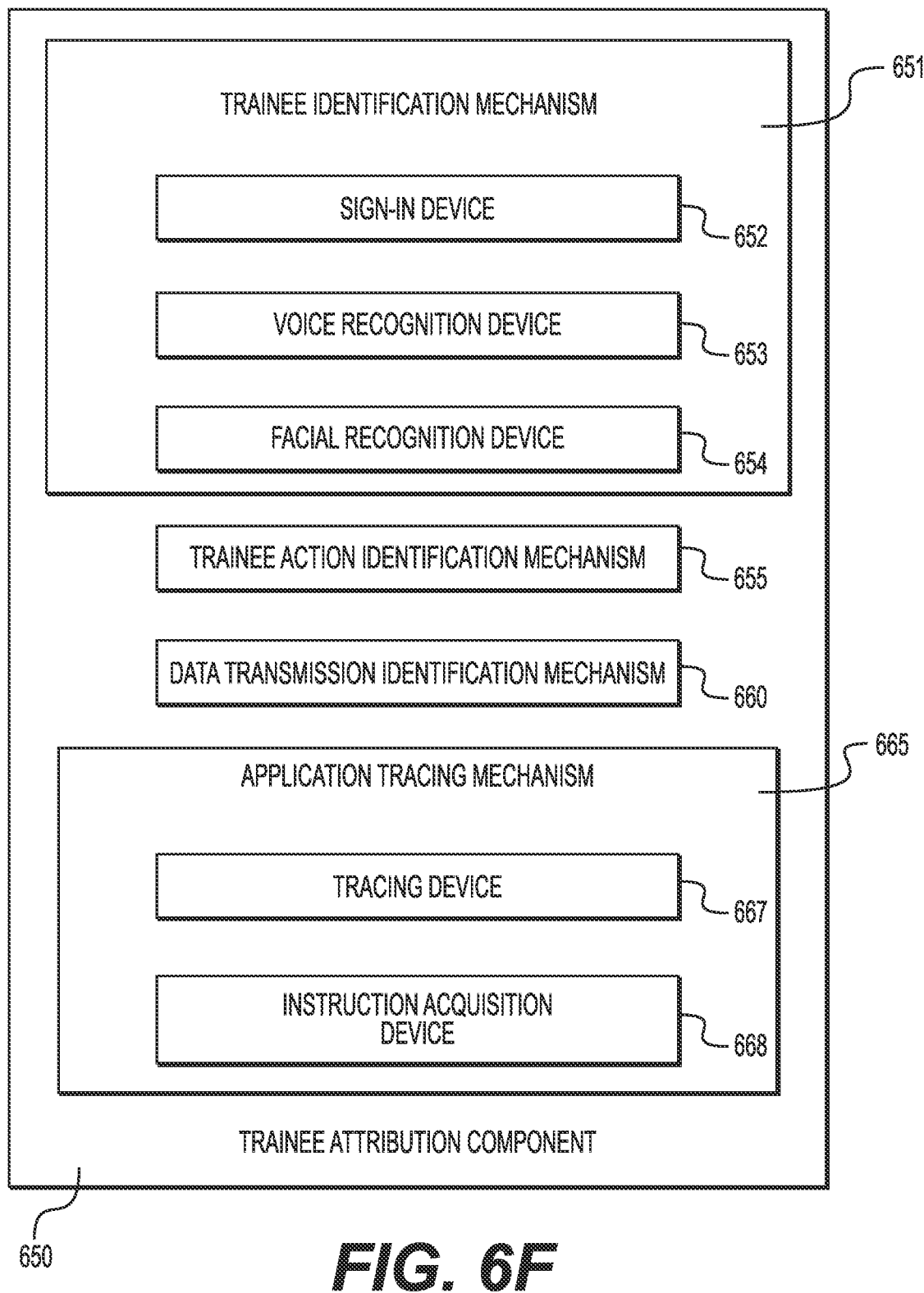

Trainee attribution component 650, shown in FIG. 6F, includes trainee identification mechanism 651, trainee action identification mechanism 655, data transmission identification mechanism 660, and event/application tracing mechanism 665. The trainee identification mechanism 651 includes trainee sign-in device 652, voice recognition device 653, and facial recognition device 654. The trainee sign-in device 652 may include a trainee user name entry block and a trainee verification block. A trainee 30 may establish a user name and a trainee verification value, both of which may be stored with the ATTEST program 200 and the trainee 30 subsequently may use the credentials to access a training exercise 330 from a specific media device 50. However, as noted herein, a simple sign-in is no guarantee the trainee 30 may use the media device 50 during the training exercise 330. Therefore, to establish a higher degree of confidence that, in a group training situation, the correct trainee 30 remains at the correct media device 50, the facial recognition device 654 may cooperate with native camera 56c to capture an image of the trainee 30 and verify the identity of the trainee 30. The image capture may occur periodically and/or upon an action taking place at the media device 50. Examples of such actions may include uploading a document, sending an email or a text message, typing, and other routine and non-routine actions. Other actions may include easily-identified actions such as shutting down virtual server 310b and lengthening the backlog queue. Another verification process may be executed by voice recognition device 652 and a native microphone 56a. An aspect of the voice recognition device 652 includes the ability to integrate voice recognition applications to access voice chat systems and in general, audio discussions among trainees 30 in the environment 300b. In an aspect, in order to analyze audio discussions between and among the trainees, the voice recognition device 652 includes a voice to text converter tool. There are numerous available speech-to-text converters as standalone software or services including Dragon NaturallySpeaking, IBM's Speech to Text service, and Google's Cloud Speech API. The voice recognition device 652 also is able to properly translate the unique vocabulary of technical terms, jargon, and acronyms used in a cyber warfare training exercise. In addition to an attribution function, the voice recognition device 652 may cooperate with document classifier component 540 to produce text-parsable documents. With or without voice-to-text conversion, the device 652 may execute to distinguish individual trainees 30 among a group of concurrently talking trainees 30 or in a noisy environment using pre-recorded voice samples from each of the trainees 30.

The trainee action identification mechanism 655 may gather information from documents created, revised, or sent from a media device 50 to verify the presence of trainee 30 at the media device 50. For example, to upload a document to a document management system, the trainee 30 may be required to electronically sign the document.

The data transmission identification mechanism 660 may read metadata associated with a document transmitted from or received by the media device 50 to identify the transmitting or receiving trainee 30. Furthermore, some trainee actions may be expressed orally, and the voice recognition device 652 may be used to capture all voice communications occurring in the environment 300b. To help accurately attribute an oral communication to a specific trainee 30, the component 650 may execute to record a sample communication (e.g., a script reading with specific words intended to capture the nuances of the speaker's voice) for each trainee prior to the beginning of the training exercise 330.

The application tracing mechanism 665 may take advantage of native tools provided on certain computing systems and/or platforms for application tracing or profiling, or other techniques. Other tools may be agnostic to computing systems and thus may be used on a variety of computing platforms. These native and agnostic tools may provide a wide range of functionalities to obtain runtime and other information on a software application such as outputting text messages, logging application or system errors and warnings, outputting objects or data structures, outputting binary data, tracing function/routine/subroutine invocations, following and outputting variable values, outputting thread or process behaviors, performing live application monitoring via network or pipes, outputting call or other stacks, outputting processor registers, and providing runtime memory access. In an aspect, obtaining an application's instructions, data, and/or other information includes the ability to examine the type or properties of an object at runtime. In an example, attaching to and/or obtaining an application's instructions, data, and/or other information may be implemented through a computing platform's native tools for application tracing or profiling, such as Microsoft® .NET System.Diagnostics.Trace and System.Diagnostics.TraceSource classes for tracing execution flow, and System.Diagnostics.Process and System.Diagnostics.EventLog classes for profiling code, accessing local and remote processes, starting and stopping system processes, and interacting with operating system logs. For example, a set of trace switches may output an application's information. The switches may be configured using a .config file. For a Web application, this may be Web.config file. In another aspect, trace code may be added to the application code automatically or manually. A listener or agent (e.g., agent 305a) may be applied where the trace output is received. Trace code may output trace messages to a specific target such as a file, a log, a database, a database management system (DBMS), an object, a data structure, and/or other repository or system. An instruction acquisition device 667 then may obtain and read the trace information from these targets. In another aspect, trace code may output trace messages directly to instruction acquisition device 667, and a listener may accommodate these specific targets.

Figure 6G:
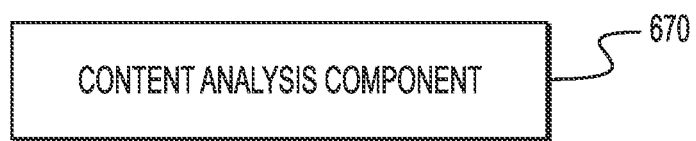
Figure 6H:
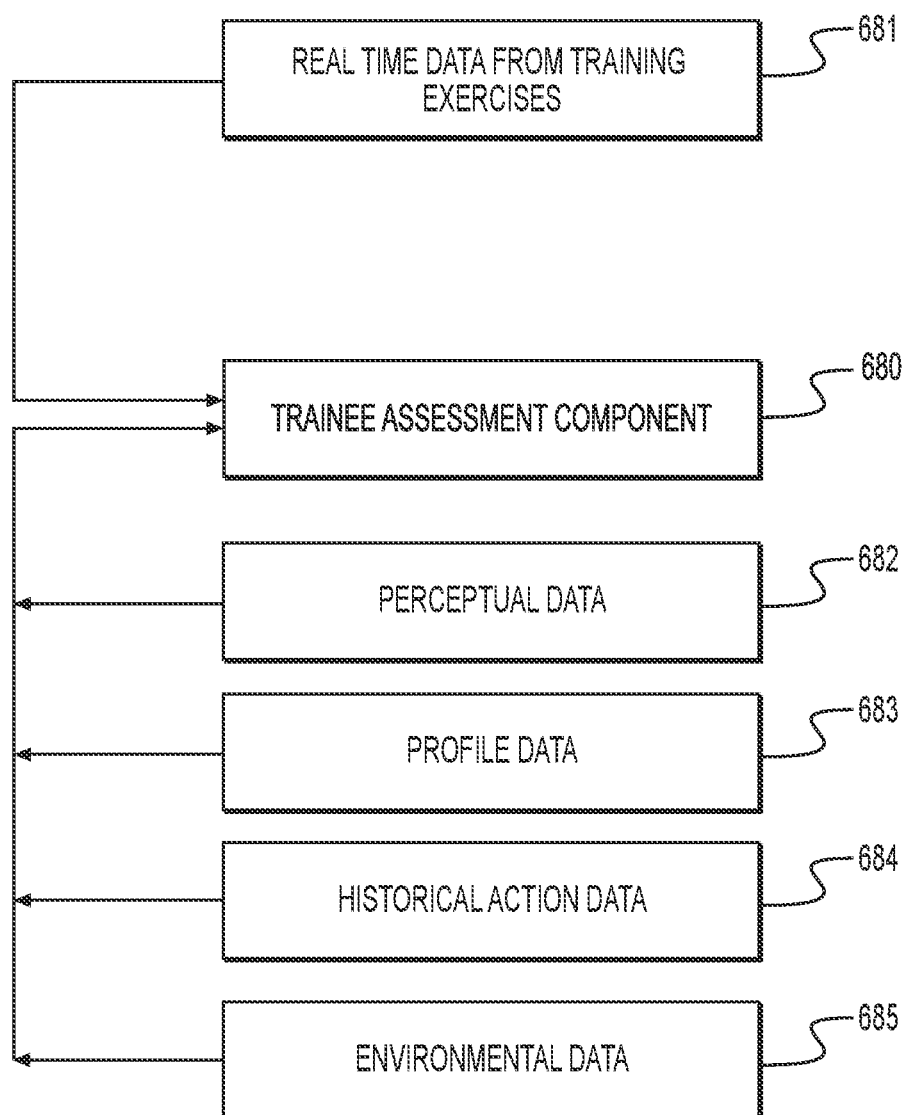

Content analysis component 670, shown in FIG. 6G cooperates with other components of the TTE module 600a to extract useful information from executed training exercises 330, including extracting information from documents (e.g., emails, instant messenger messages, voice messages (converted to text), repots, and other documents) created by trainees 30 during execution of the training exercises 330. In an aspect, the content analysis component 670 receives some extracted information from elements the ATTEST program 200. In other aspects, the component 670 executes to perform data extraction from documents. In FIG. 6G, component 670 includes data extraction mechanism Trainee assessment component 680, shown in FIG. 6H, provides mechanisms that may be used to evaluate individual trainee 30 and trainee group 32 performance a training exercise 330. One such mechanism is an exercise evaluation mechanism that executes to generate an evaluation based on the scenario script. For example, in the training scenario involving a DDoS attack implemented as a SYN flood attack, the exercise evaluation mechanism may use non-binary metrics including non-binary numerical information, such as the time taken to complete a particular action or the number of lines changed in a configuration file. The exercise evaluation mechanism also may use ancillary data alongside the action completed-type measurements and compare the data to the scenario script.

The thus-collected real-time data are processed by trainee assessment component 680 in conjunction with other data accessible to the trainee assessment component 680. In an example, the other data accessible to the trainee assessment component 680 includes perceptual data, trainee and trainee group profile data, historic trainee action data, and environmental data, all of which may be stored in database 129 under control of database manger 122. Perceptual data may include static data previously defined by a scenario developer for use during execution of a specific training exercise. The perceptual data may be based on a specific scenario corresponding to the specific training exercise. Perceptual data may be collected in real time using one or more sensors 306a. Such sensors 306a may include one or more cameras capable of capturing images, one or more microphones, a skin conductance sensor, eye tracking sensor, and/or a heart rate sensor. Some sensors may be incorporated within (i.e., native to) media device 50 or may be communicatively coupled with one or more communication interfaces of media device 50. Other sensors may be independent of the media device 50. For example, integrated, ATTEST system 100 may include or access sensors, such as those listed above, capable of producing data to be used in facial motion capture, eye tracking, speech recognition, and/or gesture/posture. Trainee profile data may be associated with the individual trainee 30 and may contain characterizing parameters associated with the trainee 30. The trainee profile data may be selected based after a trainee authentication process, such as through biometric information (e.g., facial recognition) or any other suitable authentication mechanism (e.g., trainee name and password, etc.). In an example, trainee characterizing parameters may include parameters associated with a trainee's current performance level. For instance, the components of the ATTEST program 200 may execute to detect that one or more environmental factors may either increase or decrease a trainee's performance. For example, if the ATTEST program 200 determines that the trainee's performance varies based on time of day, the ATTEST program 200 may execute to enter this observation in the trainee's profile data. Other characterizing parameters may include temperature, weather, and/or subject matter, and may also include performance levels associated with one or more of these characterizing parameters. In addition, these characterizing parameters may indicate a preferred scaffolding, or tutoring, structure for the trainee 30. For example, if the trainee 30 responds better to written exercises than to video exercises, the system 100 could designate this as a characterizing parameter. The action data may include various actions taken by the trainee 30 during execution of a training exercise. For example, the trainee 30 may compose and send an email message or a text message during the training exercise 330, and the messages may be captured and stored in the historical action data. The action data also may include keystroke data (if the trainee 30 operates a computer, for example), and other actions taken by the trainee 30. Environmental data 684 may include data captured by various sensors. Environmental data may include ambient noise levels, temperature, humidity, lighting conditions, and similar data. These data, and any other "on-the-fly" data suitable for determining a performance level of the trainee 30, may be provided to trainee assessment component 680.

Figure 7A:
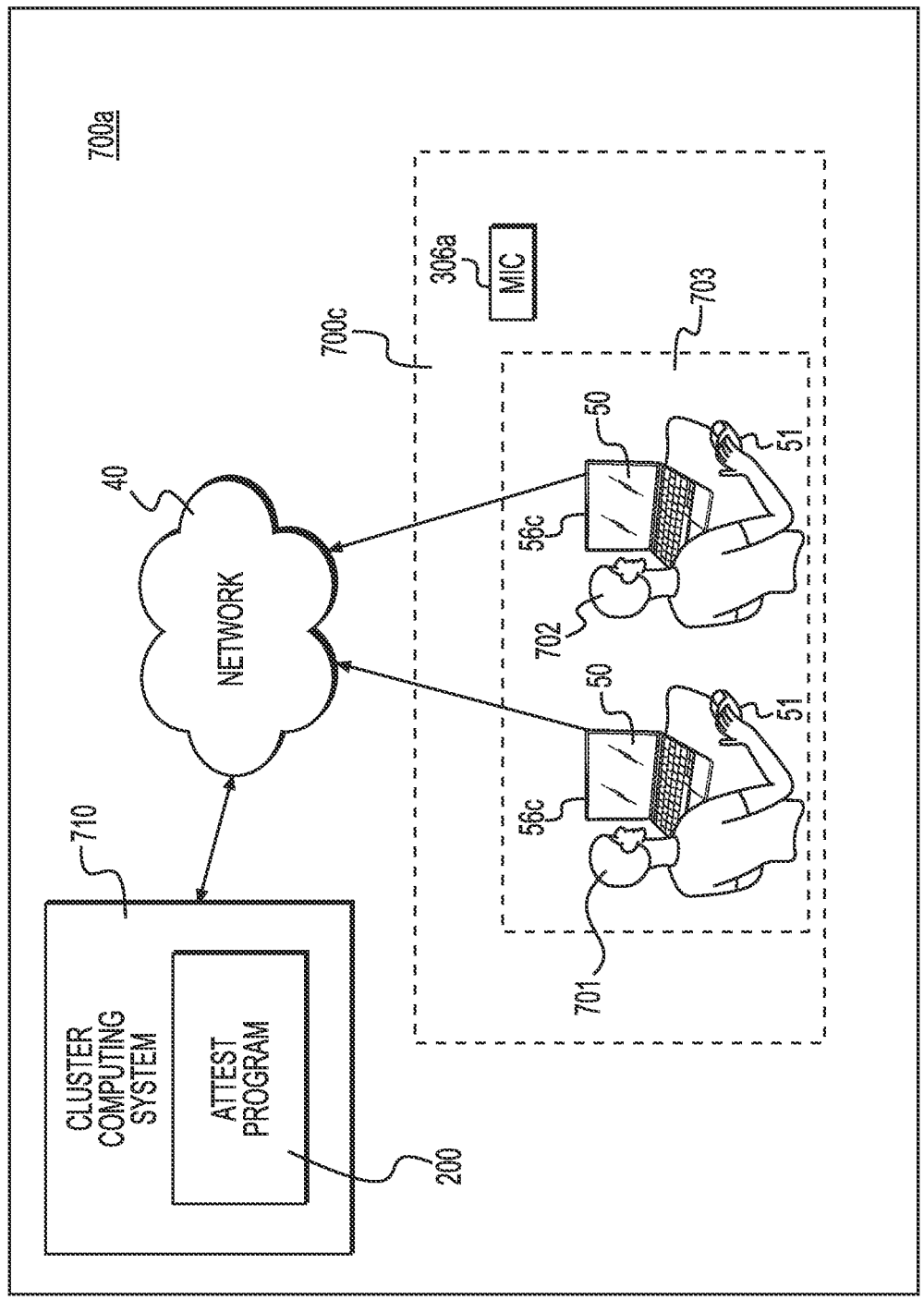
FIGS. 7A-7C illustrate alternate environments in which the program of FIG. 2A provides adaptive team training and evaluation.
Figure 7B:
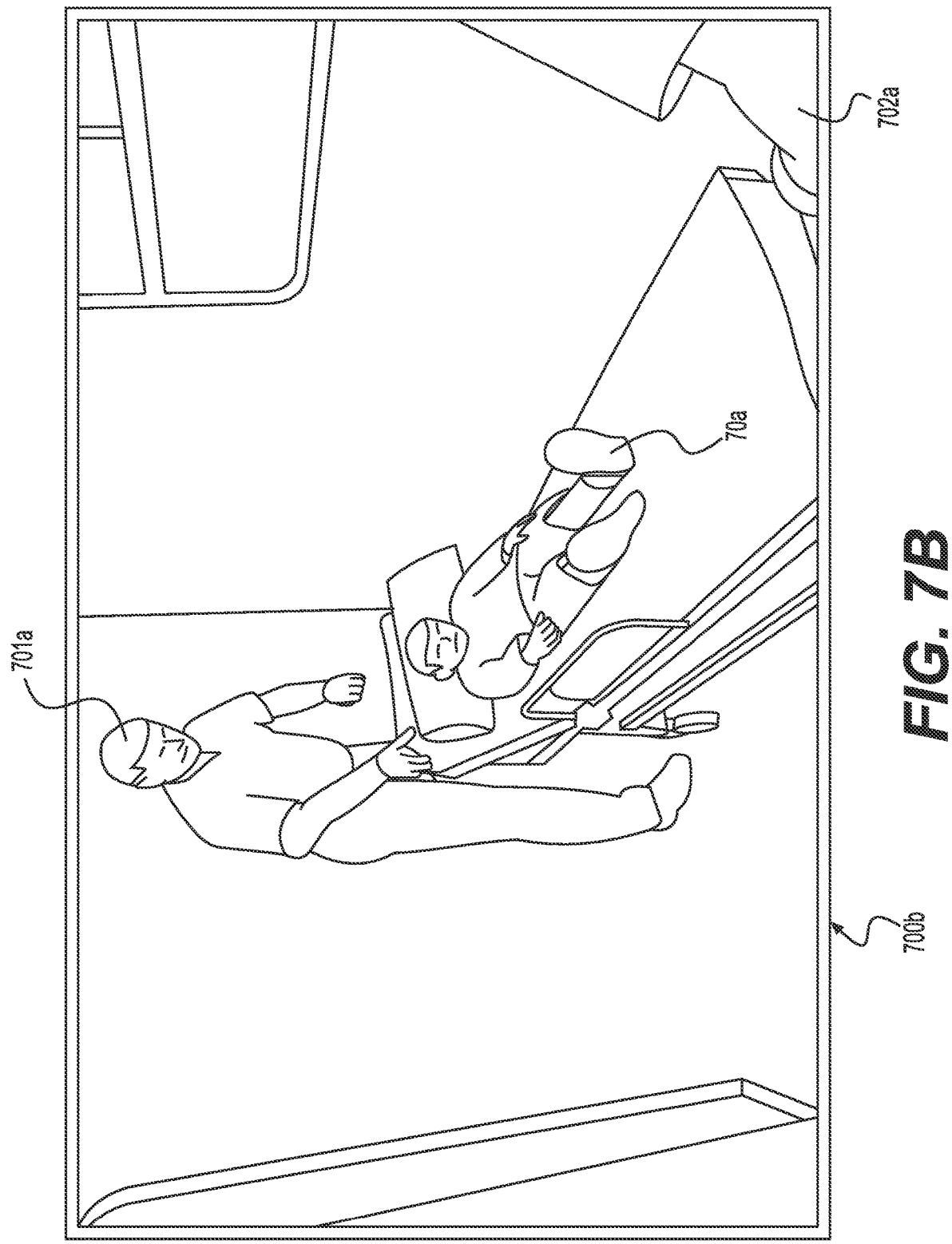
Figure 7C:
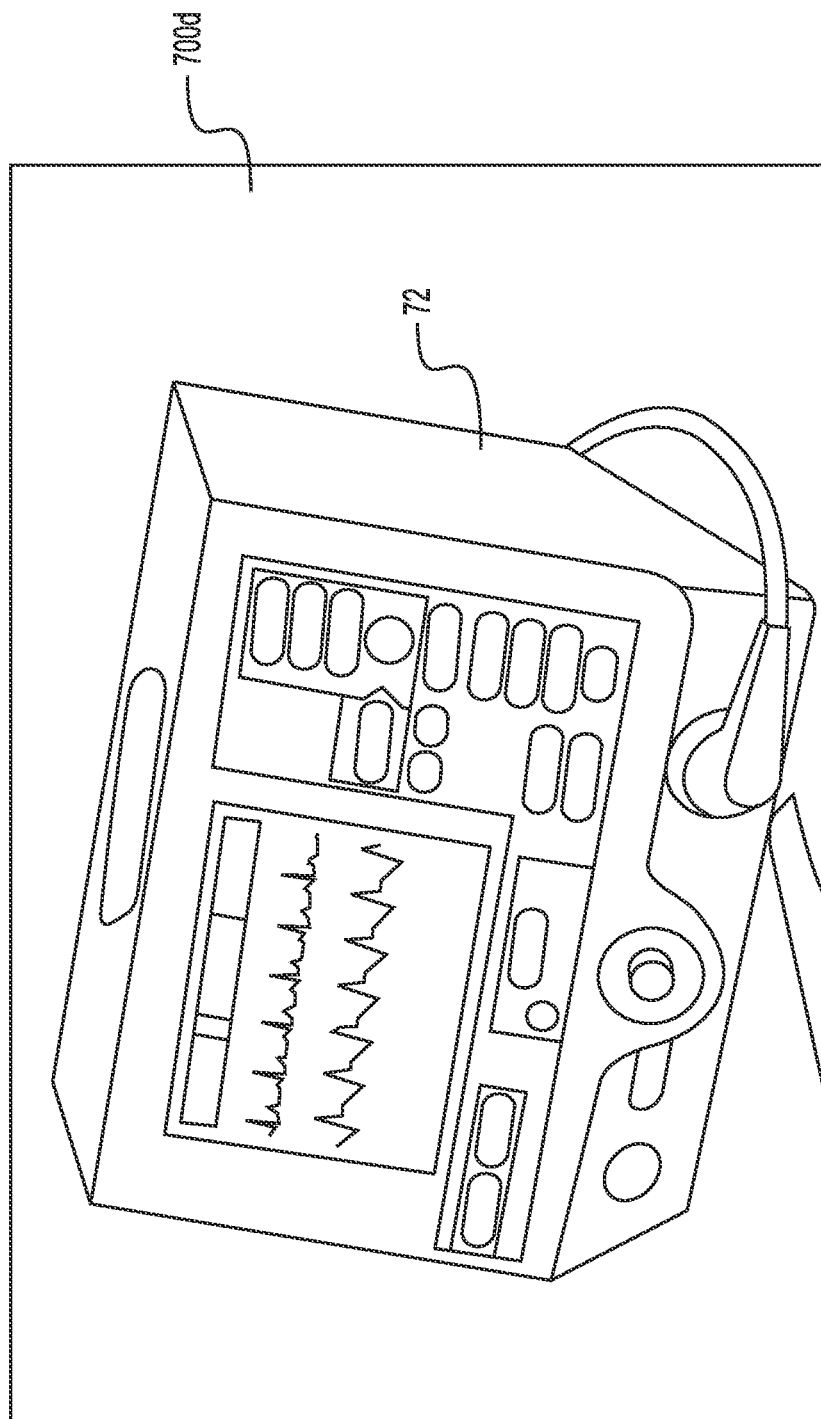

FIGS. 7A-7C illustrate aspects of the ATTEST program 200 used for training medical emergency teams and individual medical emergency personnel. In FIG. 7A, medical emergency response team 703 includes individual medical emergency response technicians 701 and 702. The technicians 701 and 702 may be employed by organization 704, which may be a hospital. The team 702 may be assigned to an ambulance crew (not shown). To maintain the proficiency of the team 703 in a variety of medical emergencies, the organization 704 may implement the ATTEST program 200 on a suitable computing system, which includes cluster computing system 710 and trainee workstations 50. Elements of the ATTEST program 200 may be implements on each of the workstations 50. The cluster computing system 710 may be a dedicated, standalone system, or may be an element of a larger computing system operated by the organization. The cluster computing system 710 and the workstations 50 may have access to network 40, and the workstations 50 may be at location 700c, remote from the cluster computing system 710. The cluster computing system and the workstations 50 together may define training environment 700a. The workstations 50 may include native camera 56c, and may be operated in part though I/O device 56d (a mouse). In most respects, the workstations 50 and the network 40 may have the same characteristics as similar components shown in FIG. 1A. The training environment 700a also may include monitoring device 306a, which is a microphone that receives voice communications between the technicians 701 and 702. One or more medical emergency training exercises may execute in the environment 700a.

In an example, the technicians 701 and 702 operate their respective workstations in response to a medical emergency training exercise involving a patient (a young boy) in an ambulance to train and test the technicians on proper medical treatment considering the patient, the location of emergency care (an ambulance), and the medical emergency experienced by the patient.

To add realism to the training exercise, the technicians 701 and 702 are represented as 3-D avatars 701A and 701B in a virtual ambulance 700b, which represents a virtual medical emergency response system situation, as shown in FIG. 7B. The display of FIG. 7B is shown on each of the workstations 50. The avatars 701A and 702B are rendered to look like the medical technicians 701 and 702. The avatars 701A and 701B move on the display in accordance with movements of the technicians 701 and 702 at the workstations 50 during execution of the medical emergency training exercise.

During execution of the medical emergency training exercise, avatar 70A representing the patient may move under control of the ATTEST program 200, and medical monitors connected to the avatar 70A may display appropriate medical signals. FIG. 7C illustrates in display 700d, medical monitor 72, which may be connected to the patient avatar 70A during the training exercise by either of the avatars 701A and 701B. During execution of the training exercise, the medical technicians 701 and 703, through their respective avatars 701A and 702A, perform tasks comprising actions in response to event injections. For example, avatar 701A may provide mount-to-mouth resuscitation of avatar 70A when an event, breathing stops, is injected. Trainee action attribution may in some respects be simplified through use of the avatars 701A and 701B. However, the native cameras 56c and the microphone 306a also may be employed for trainee action attribution.

Figure 8:
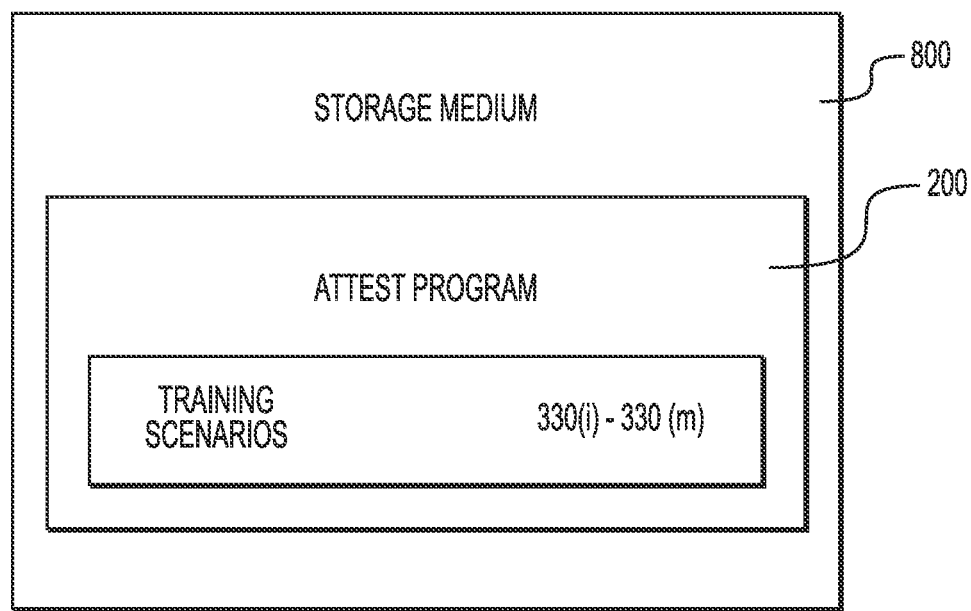
FIG. 8 illustrates a product embodying aspects of the program of FIG. 2A.

FIG. 8 illustrates a product 800 encompassing ATTEST program 200 and its potential use in a training environment. The product 800 may be a non-transitory computer readable storage medium on which is stored ATTEST program 200. The product 800 may be provided to organizations and individuals, and may be used to generate an adaptable team training exercise environment, such as the virtual cyber range 300 of FIG. 3B and the virtual medical emergency environment 700 of FIG. 7B, and to create training scenarios and execute training exercises. The ATTEST program 200 includes the modules shown in FIG. 2A. In addition, the ATTEST program 200 may include a number of pre-defined training scenarios 331, which are stored with the ATTEST program 200 on the product 800. For example, the ATTEST program 200 may include pre-defined training scenarios 331(*i*)-331(*n*) for a number of cyber warfare attacks of a generic, virtual computer network. An observer/instructor 22 may quickly provide a corresponding team training exercise 330(*i*) by selecting a desired pre-determined training scenario 330(*i*). Alternately, a scenario developer 24 may use the scenario development tools and other tools, provided in modules of the ATTEST program 200 to generate custom cyber warfare training scenarios. In an aspect, the scenario developer 24 may use a scenario template and drag and drop code segments or chunks to generate the custom cyber warfare training scenarios. In another aspect, the scenario developer 24 may write custom software programs to generate a custom cyber warfare scenario.

Figure 9:
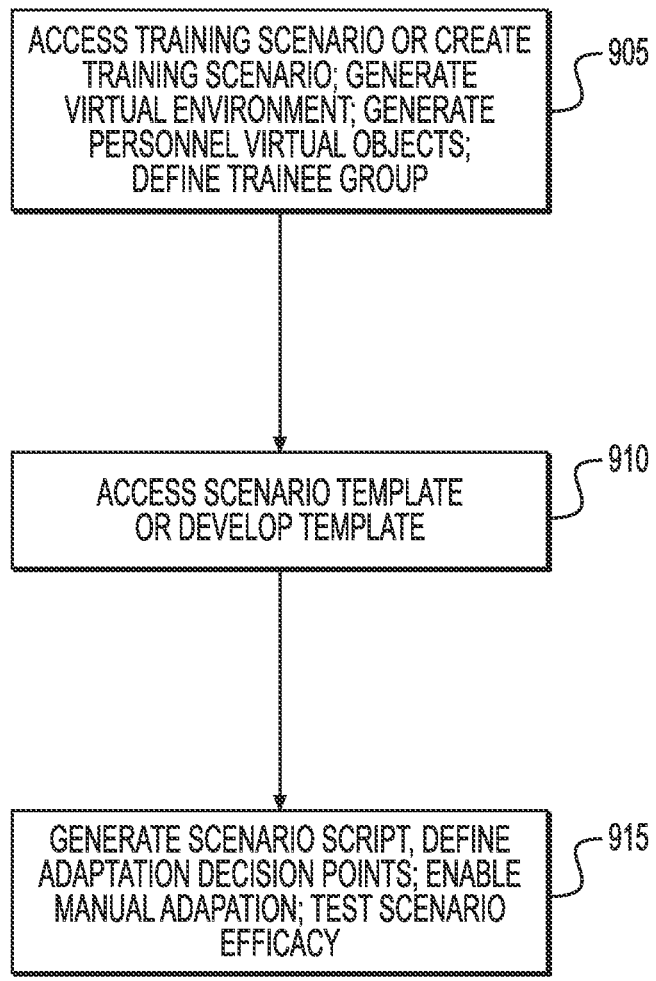
FIGS. 9-13 are flowcharts illustrating example operations of the system of FIGS. 1A and 1B and the program of FIG. 2A.

FIGS. 9-13 are flowcharts illustrating example operations executed by the ATTEST program 200 as implemented in environment 300b of FIG. 3B. The operation shown in FIG. 9 may be executed in any order of the sub-operations (blocks) described below. In FIG. 9, operation 900 begins in block 905 when scenario developer 24 accesses existing training scenario 331 or generates one or more base training scenarios 331 for use in training teams of IT personnel who work for organization 20. The base scenarios 331 are directed to various cyber warfare situations and cyber warfare defenses. As part of block 905, the scenario developer 24 either accesses or constructs a virtual environment (e.g., the virtual cyber range 300) that includes a number of virtual objects including a virtual network and virtual components and structures of the virtual network, and virtual programs such as virtual cyber warfare defense mechanisms, and defines the parameters and capabilities of the virtual objects.

In an aspect, the scenario developer 24 may use the drag and drop tools of the ATTEST program 200 to construct the virtual environment. The drag and drop tools may accesses a database of pre-defined, or specially created virtual objects such as a virtual HTTP server. The virtual objects may be shown in a display such as the display of FIG. 3B. As a further part of block 905, the scenario developer 24 may generate one or more IT personnel virtual objects—that is, representations of IT personnel who would respond to the cyber warfare attack—thereby defining a trainee group 32. In an aspect, the personnel virtual objects are animated avatars. In a further aspect, the animated avatars are visually similar to the person the avatars represent. In a still further aspect, the ATTEST program 200 tracks all actions performed by a specific avatar to attribute a specific trainee 30. In block 910, the scenario developer 24 accesses an existing scenario template 301a if a suitable template exists for a desired cyber warfare situation such as a SYN flood DDoS attack. If a suitable template does not exist, the scenario developer 24 may develop the template (i.e., write a computer program), or may contract with a program developer to generate the template. In block 915, the scenario developer 24 generates a scenario script for the base training scenario 331. The scenario script may be a plain English-language statement of events (injections) and their timings, associated displays, indications, and signals that would be available to IT personnel experiencing the attack, expected actions and a time range for initiating and completing the expected actions, associated displays, indications, and signals resulting from the actions, and any network state changes that would occur as a result of the injections and the corresponding actions. Finally, the scenario script may include one or more adaption decision points where a corresponding, executing training exercise 330 may automatically and dynamically adapt to a different path or sequence of events. The scenario developer 24 may provide the adaptation criteria at each adaptation decision point. Finally, the scenario developer 24 may enable manual adaptation of a corresponding, executing training exercise. Manual adaptation may involve allowing the observer/instructor 22 to select an alternate, predefined adaptation path from the base training scenario 331 within a specified time range of the base training scenario 331. In addition, the scenario developer 24 may enable manual changes to some injections, without causing a manual adaptation of the executing base training exercise 330. For example, the operator/instructor 22 may accelerate or delay a specific injection. Following generation of the base training scenario 331 and one or more adaptation scenarios 331A, the scenario developer 24, in block 915, may test the efficacy of the base training scenario 331 by executing a corresponding test base training exercise 330.

Figure 10:
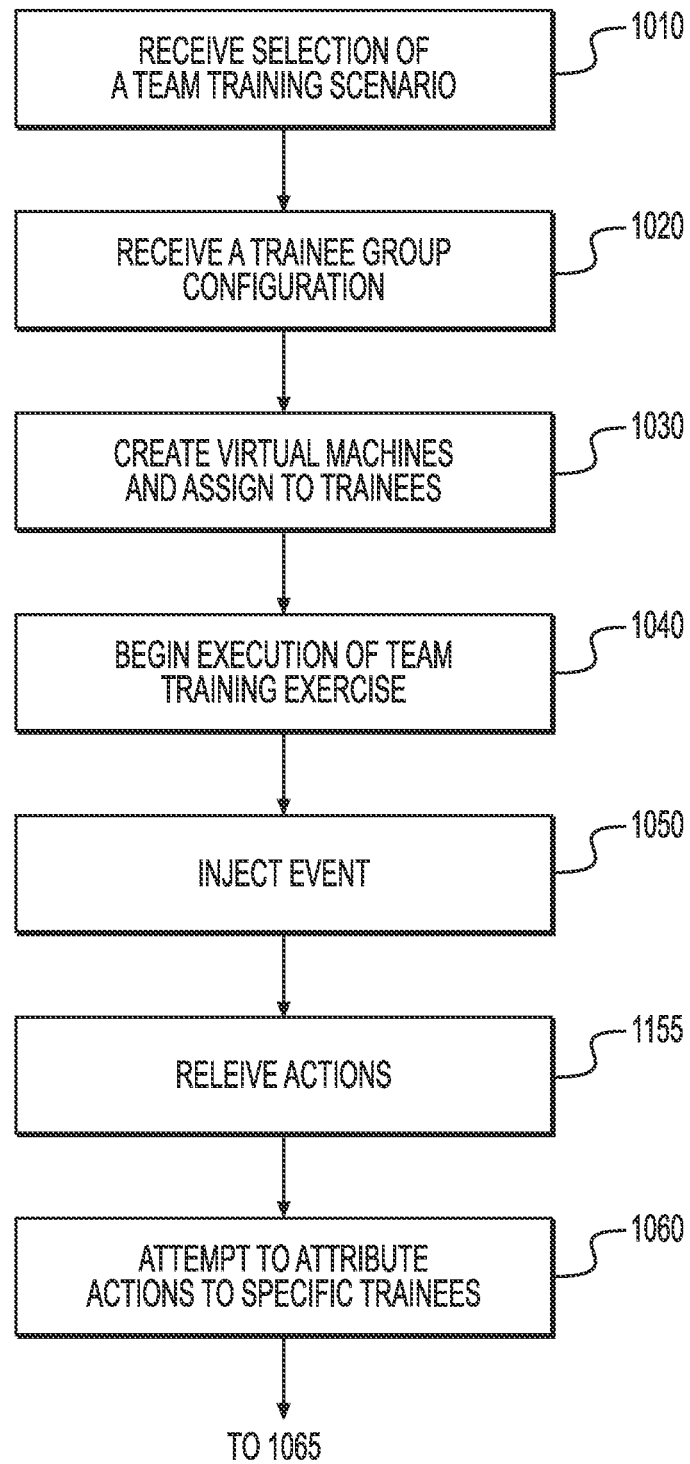
Figure 10:
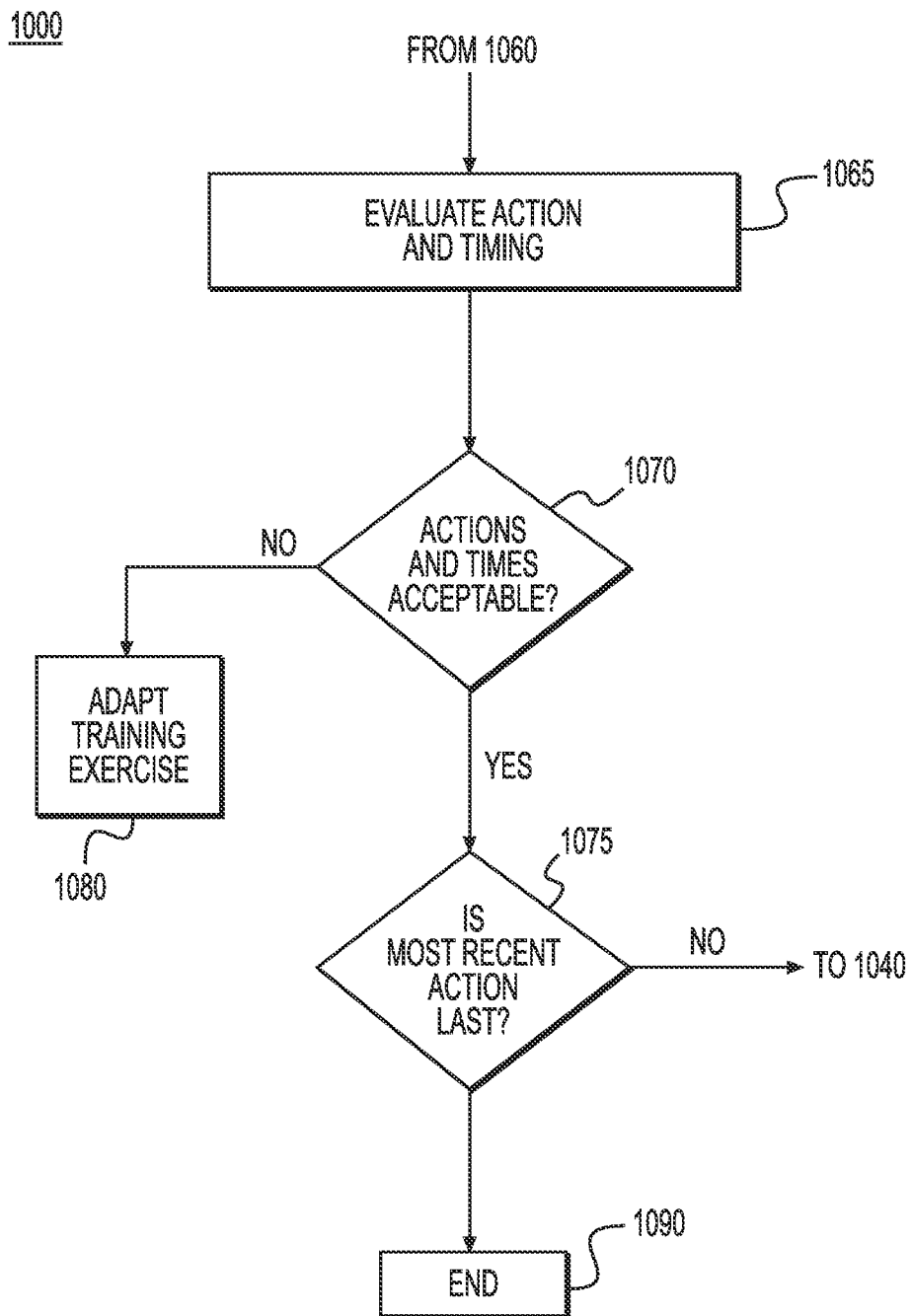

FIG. 10 illustrates a trainee exercise control operation 1000 for an observed base training exercise 330 provided through execution of the ATTEST program 200. In FIG. 10, operation 1000 begins in block 1010 when the ATTEST program 200 receives from an observer/instructor 22, a selection of a team training scenario 331. In block 1020, the ATTEST program 200 receives a trainee group configuration. The trainee group definition may be pre-defined, or may be created by the trainees 30 using the collaboration and communication tools of the ATTEST program 200 to generate team assignments and responsibilities and to define communications methods for use among the team. Use of the collaboration and communication tools ensures the team assignments and responsibilities and communications methods will coincide with those required by the training scenario 331. In block 1030, the ATTEST program 200 creates virtual machines 340 and assigns the virtual machines 340 to individual media devices 50. The ATTEST program 200 further assigns agents 305a and 305b to collect specified data (e.g., assigns an agent 305b to camera 56c), and as appropriate, invokes sensors 306a to provide data directly to the ATTEST program 200. In block 1040, the ATTEST program 200 begins execution of team training exercise 330, including all required data collection. In block 1050, the ATTEST program 200 injects an event, and awaits actions from the trainee group 32. In block 1055, the ATTEST program 200 receives one or more actions from the trainee group 32 and records the times of the actions. In block 1060, the ATTEST program 200 determines one or more of the actions is attributable to a specific trainee 30, and records the action and its receipt time. In block 1065, the ATTEST program 200 evaluates the actions and the times of receipt to determine if they are acceptable. In block 1070, if the actions and receipts are acceptable, the ATTEST program 200 determines, block 1075, if the most recent injection is a last injection of the training exercise 330. In block 1075, if the most recent injection is not the last injection, operation 1000 returns block 1040. In block 1075, if the most recent injection is the last injection, following any actions in response to the last injection, the operation moves to block 1090 and ends. In block 1070, if the actions and receipts are not acceptable, the ATTEST program proceeds to block 1080 and executes an adaptation operation.

FIG. 3F illustrates an action evaluation and adaptation operation, namely execution of algorithm 309, that may coincide with the operation of block 1070.

Figure 11:
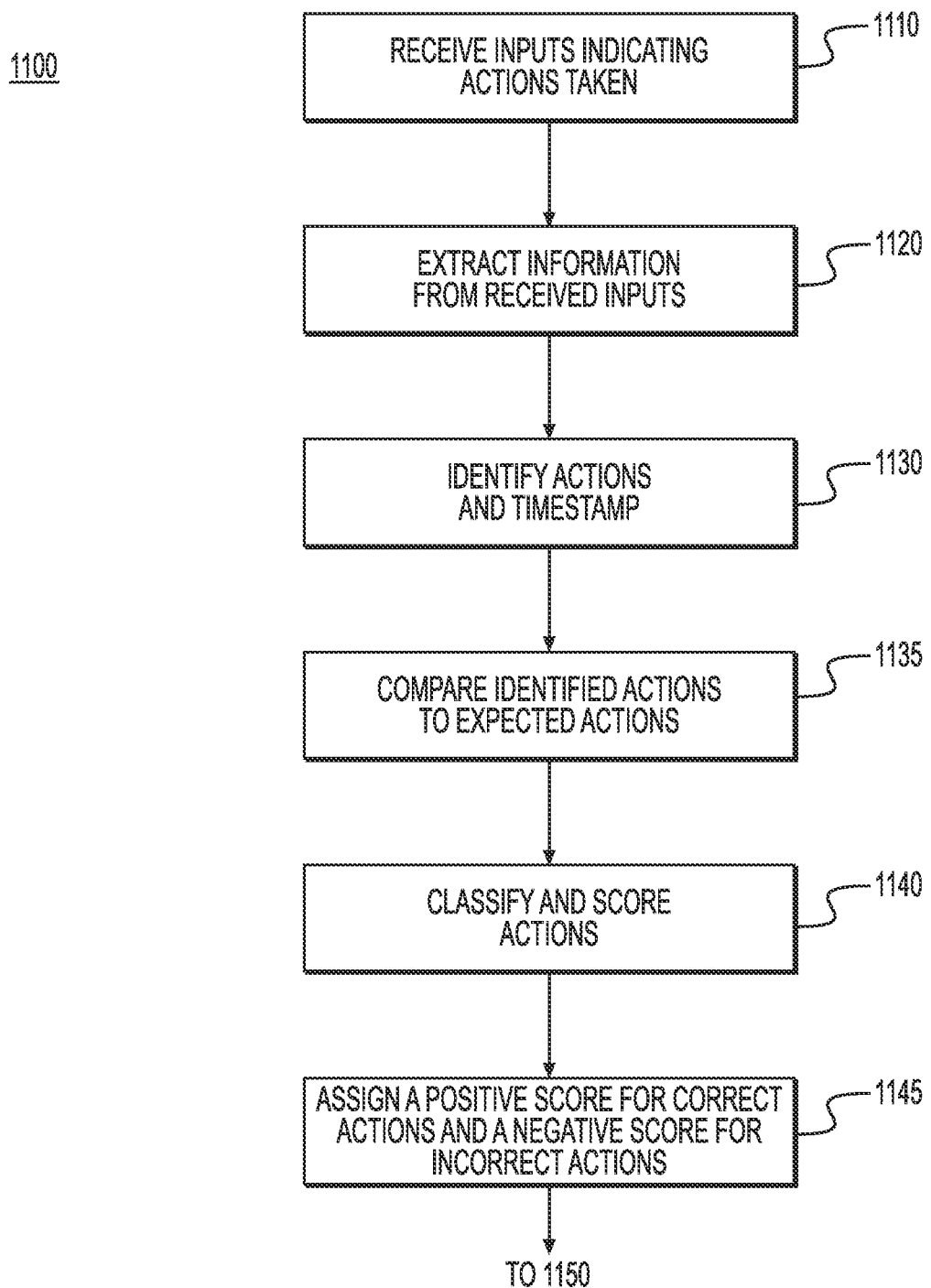
Figure 11:
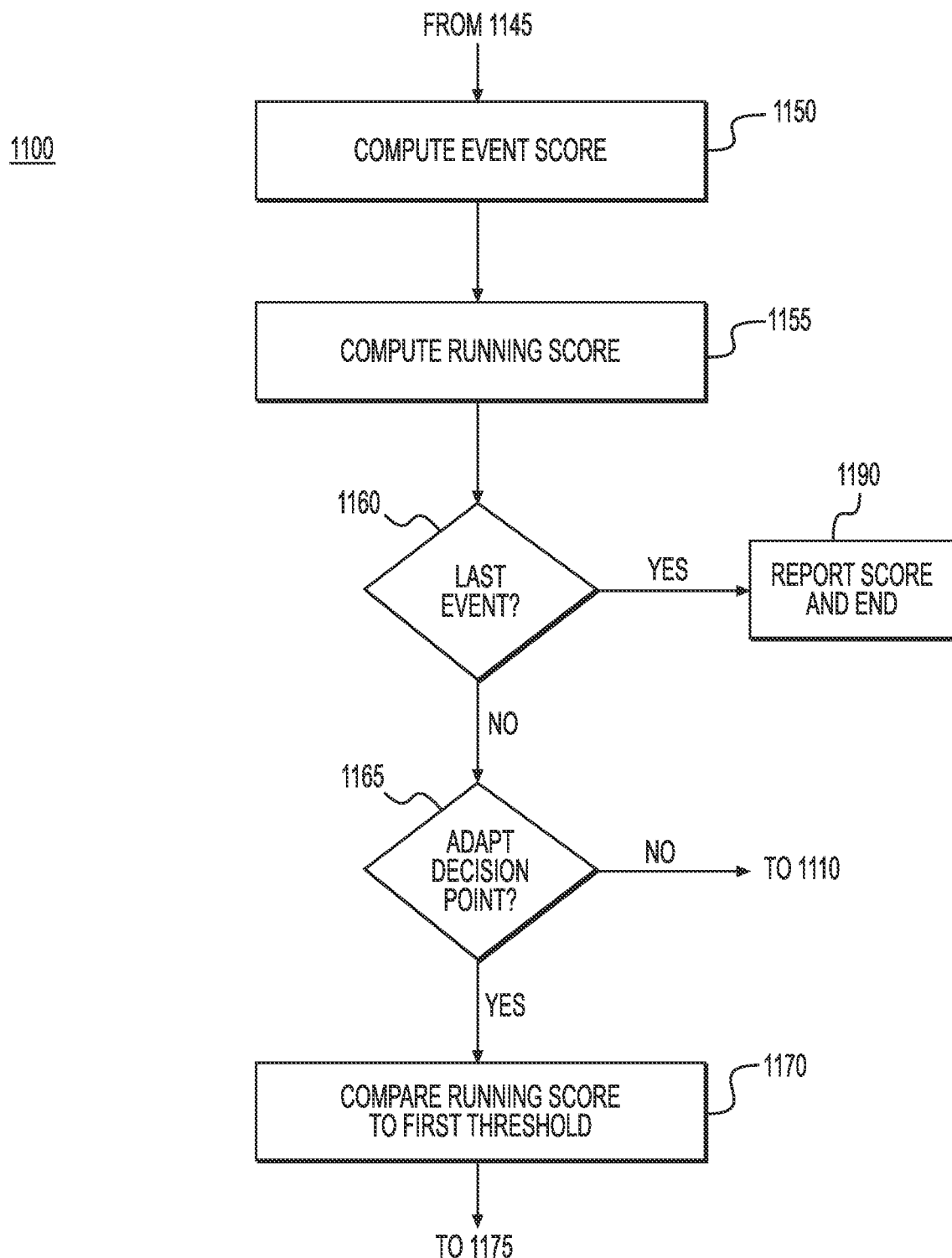
Figure 11:
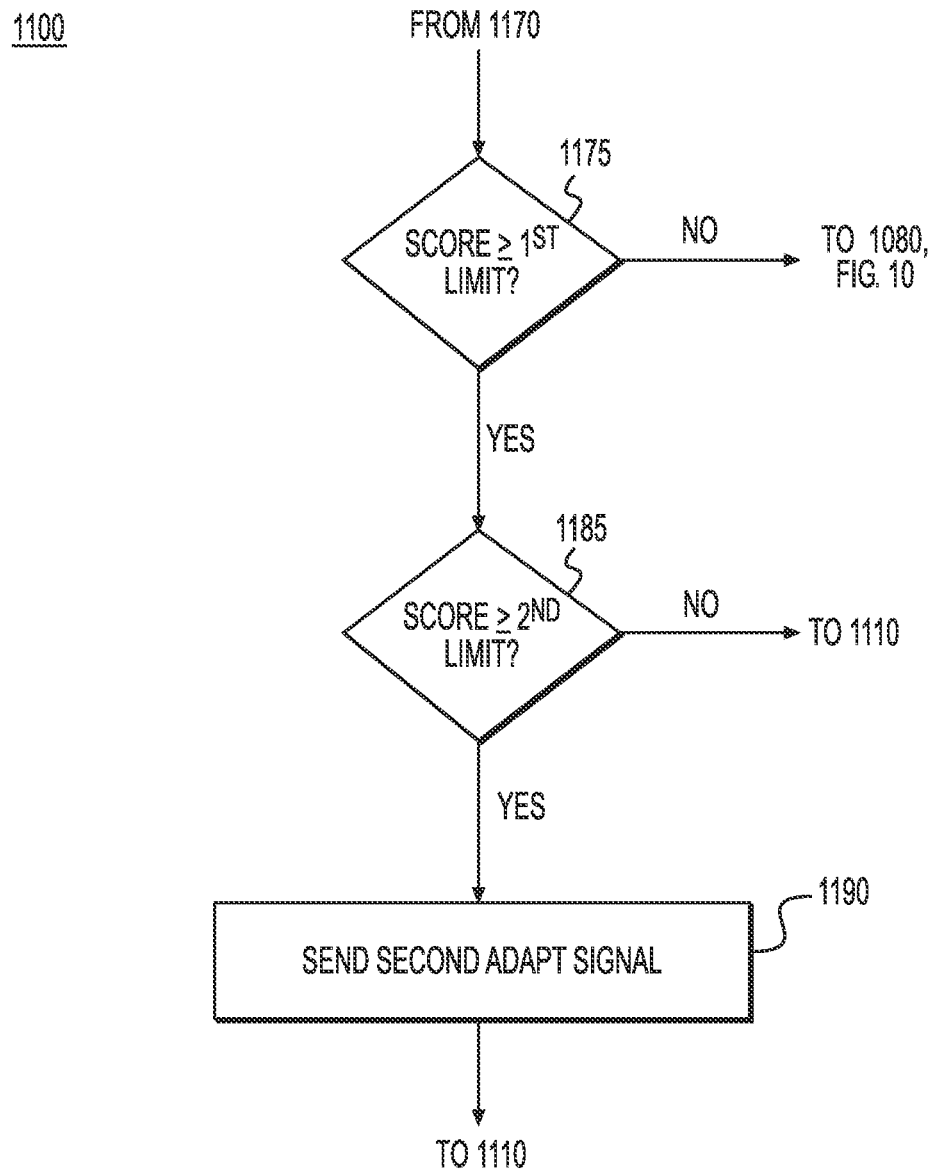

FIG. 11 illustrates another example action evaluation and adaptation operation that coincides with the operation of block 1070. Operation 1100 begins in block 1110 when the ATTEST program 200 receives inputs from sensors 306a and agents 305a and 305b indicative of actions taken by trainees 30 of trainee group 32. For example, an agent 305a may supply a signal sent from a virtual machine 340 to perform an operation of a network server 310b in response to a DDoS event. In block 1120, the ATTEST program 200 extracts relevant information from the received inputs. In block 1130, the ATTEST program 200 identifies the actions taken from the extracted relevant information, and provides timestamps for the identified information. In block 1135, the ATTEST program 200 compares the identified actions to expected actions for the injected event and classifies each of the identified actions that correspond to expected actions according to its correctness, criticality, and timeliness. For example, an identified action that corresponds to a critical action may be classified as correct, critical, and timely, correct, critical, and not timely, or correct and not critical. Other identified actions may be classified as correct, not critical, and not expected (basically, actions that have little or no impact on the training exercise); incorrect, and incorrect and catastrophic. If no identified action is noted within an expected time frame to correspond to one or more expected actions, the non-action also is recorded. The actions taken and their classification also are provided to other operations executed by the ATTEST program 200. The identified, classified actions then are scored, block 1140, by the ATTEST program 200 according to its critical classification and its correctness. In block 1145, the ATTEST program 200 assigns a positive score for each correct classified action and a negative score for each incorrect action. In block 1150, the ATTEST program 200 computes an event score based on the actions and non-actions, and their timing, following injection of the event. In block 1155, the ATTEST program 200 computes a running, or cumulative, event score. In block 1160, the ATTEST program 200 determines if the most recently scored event is the last event of the training exercise 330. If the most recently scored event is the last event, the operation 1100 moves to block 1190 and the ATTEST program 200 reports the running event score and ends. If the most recently scored event is not the last event, the operation 1100 moves to block 1165 and the ATTEST program 200 determines if the training exercise 330 has reached an adaptation decision point. If an adaptation decision point has not been reached, the operation 1100 returns to block 1110. If an adaptation decision point has been reached, the operation 1100 moves to block 1170 and the ATTEST program 200 compares the running event score to a first threshold value. In block 1175, if the running event score is less than the first threshold value, the operation 1100 moves to block 1180 and the ATTEST program 200 sends a first adaptation signal. In block 1175, if the running event score is greater than or equal to the first threshold value, the operation 1100 moves to block 1185, and the ATTEST program 200 determines if the running event score is greater than or equal to a variable second threshold value. If the running event score is not at least equal to the variable second threshold value, the operation returns to block 1110. If the running event score is at least equal to the variable second threshold value, the operation 1100 moves to block 1190 and the ATTEST program 200 sends a second adaptation signal.

Figure 12:
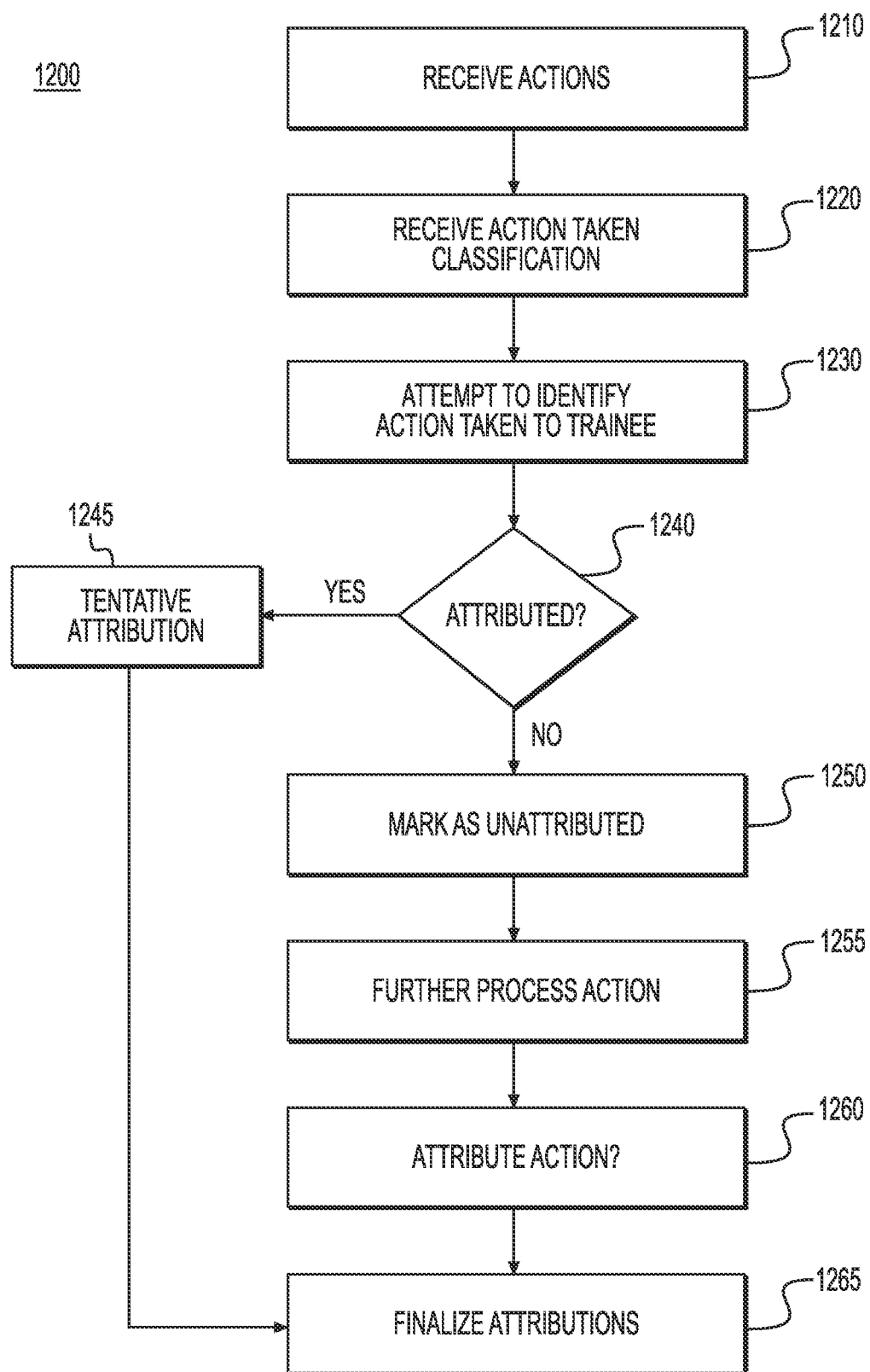

FIG. 12 illustrates a trainee attribution operation 1200 corresponding to block 1060. However, the trainee attribution operation 1200 may not be completed until after completion of the executing team training exercise 330. In FIG. 12, operation 1200 begins in block 1210 when the ATTEST program 200 receives actions before a first event injection or after any event injection. In block 1220, the ATTEST program 200 receives the action taken classification from block 1140 of operation 1100. In block 1230, the ATTEST program 200 receives data and metadata associated with each action taken and attempts to identify the specific trainee 30 who initiated the action taken. In block 1240, if the action taken can be unambiguously attributed to a specific trainee 30, operation 1200 moves to block 1245. Otherwise, operation 1200 moves to block 1250. In block 1245, the ATTEST program 200 tentatively attributes the action taken to the specific trainee 30. In block 1250, the ATTEST program 200 marks the action taken as unattributed. Following block 1250, operation 1200 moves to block 1255, the ATTEST program 200 performs additional processing of the unattributed action to attempt to attribute the action to a specific trainee 30. In block 1260 determines if the unidentified action is attributed to a specific trainee 30. In block 1260, if the action can be attributed, the operation 1200 moves to block 1265 and tentatively attributes the action to the specific trainee 30. If the action cannot be attributed to a specific trainee, the operation moves to block 1270 and the ATTEST program 200 stores the unattributed action taken in database 129. Following blocks 1245 and 1270, after the training exercise execution ends, the ATTEST program 200 executes an operation to finalize attribution of all tentative attributions. The operation 1200 then ends.

Figure 13:
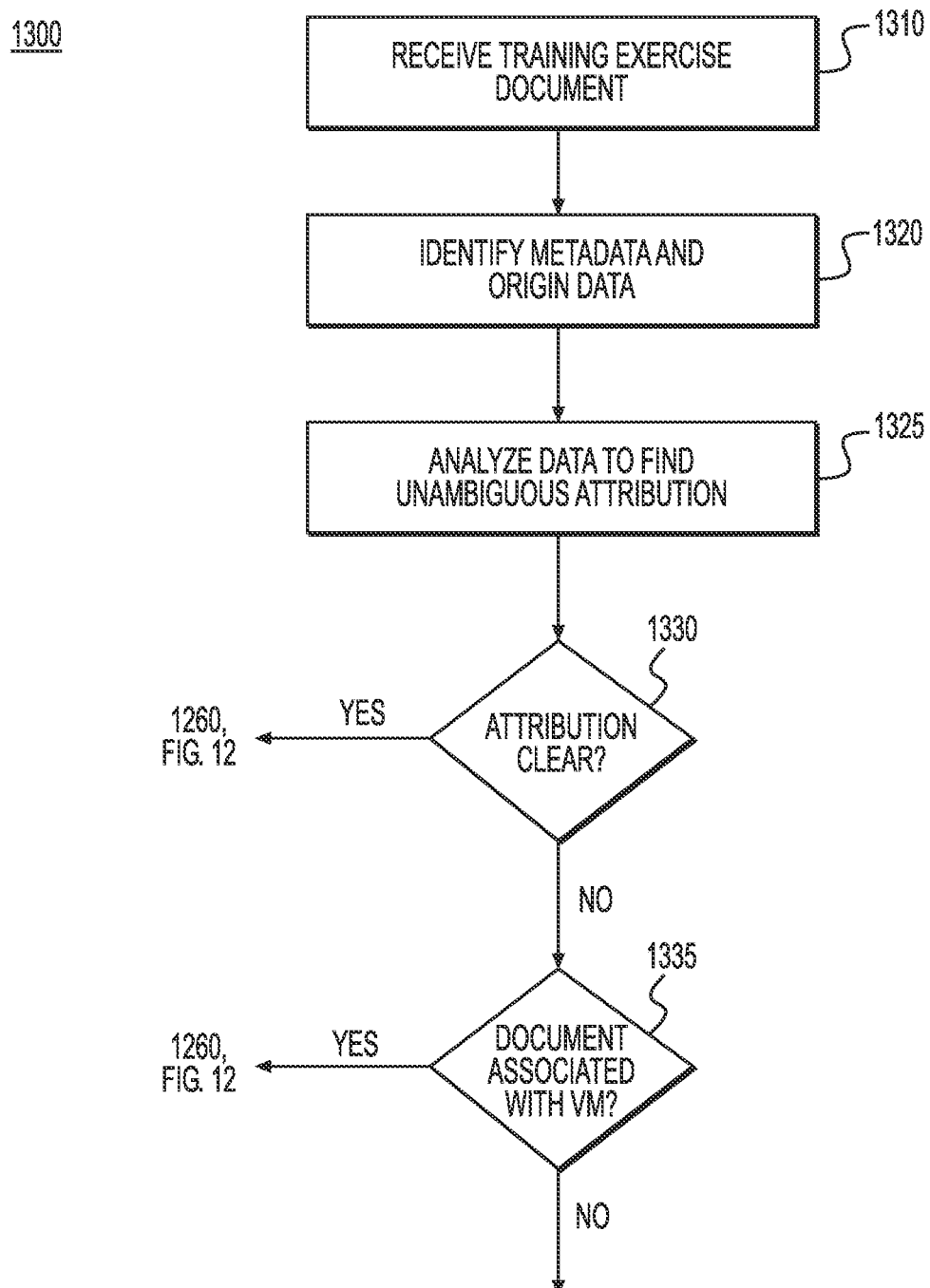
Figure 13:
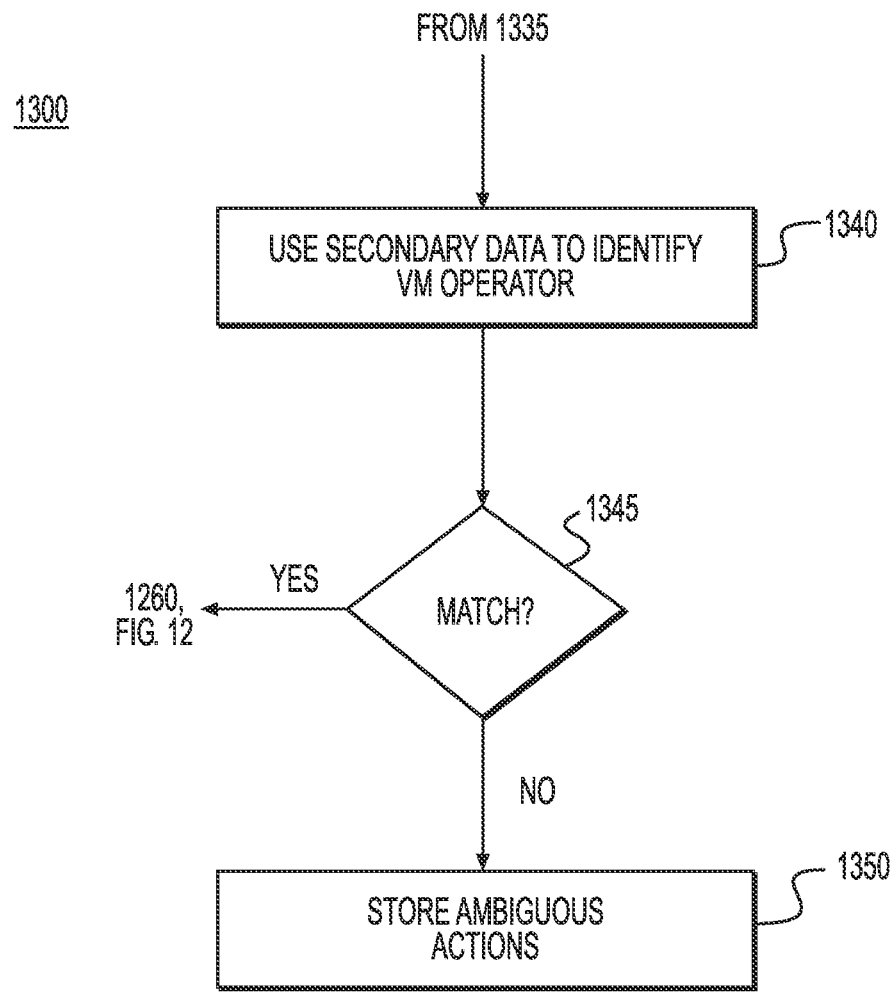

FIG. 13 illustrates the attribution operation of blocks 1230 and/or block 1255 in more detail. In FIG. 13, operation 1300 begins in block 1310 when the ATTEST program 200 receives a training document generated during the execution of team training exercise 330. As used herein, a training document may be any text document, including an email and an SMS message, any voice communication, including a general voice recording in the environment 300b during execution of the team training exercise 330, a signal, such as a keystroke or other operation of an element of a media device 50, and any other form of communication that may be captured by an agent 305a or 305b, a listener, or a sensor 306a. In block 1320, the ATTEST program 200 executes to identify any metadata or origin data that may be used to identify the trainee 30 who initiated the action. However, some documents may only be traceable to the virtual machine 340 or media device 50 from which the documents originated. That is, the identity of the specific trainee 30 may not be available directly from the documents. For documents having an unambiguous association with a specific trainee 30, the operation moves to block 1245 or 1260. For documents lacking an unambiguous association with a specific trainee 30, the operation 1300 moves to block 1330. In block 1330, for certain documents such as those associated with a specific virtual machine 340 or media device 50, the ATTEST program 200 attempts to identify the trainee operating the virtual machine 340 or media device 50. One aspect of the operation of block 1330 is to compare a facial image of the operator of the virtual machine 340 or media device 50 when the document in question was originated. One element of this aspect involves comparing an image of the virtual machine operator captured by camera 56c of the originating media device 50, if such image exists, with a database of trainee images to identify the specific trainee 30. Another aspect of the operation of block 1330 involves comparing a voice print captured through microphone 56b of the media device 50 to a database of voice prints for the trainees 30. In either aspect, if a match occurs within a specified confidence level, the document may be unambiguously attributed to the specific trainee 30, and the operation 1300 moves to block 1260. If the document still cannot be unambiguously attributed to a specific trainee 30, the operation 1300 may continue if other identification means are possible. If no other identification means are possible, the operation 1300 moves to block 1270.

Certain of the devices shown in the Figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the examples represented in FIGS. 3F and 9-13. The disclosed devices, components, and systems contemplate using or implementing any suitable technique for performing the steps illustrated. Thus, FIGS. 3F and 9-13 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A system for evaluating collective expertise of a group of trainees, comprising:
a central processor station, comprising:
virtual network computing connections to trainee operated media devices,
software agents configured to access data captured by trainee group sensors and from native sensors installed on the trainee operated media devices, and
a control station coupled to the trainee operated media devices, the control station comprising a user display and a user operated control device; and
the central processor station configured to:
generate a virtual training program comprising a virtual network;
initiate a corresponding group training exercise for two or more trainees, the group training exercise comprising one or more challenges, each of the one or more challenges comprising a first pre-defined sequence of one or more injectable events;
control a subsequent execution of the group training exercise comprising injecting the injectable events; and
execute a group performance evaluation of the trainee group during the subsequent execution of the group training exercise, and automatically and in real-time during the subsequent execution of the group training exercise, adapt the group training exercise comprising stopping the first pre-defined sequence and starting a second pre-defined sequence of one or more second injectable events, wherein a user operates the control station to monitor the group training exercise.

2. The system of claim 1, wherein the trainee group sensors comprise hardware sensors selected from a first sensor group consisting of temperature and humidity monitors, a video camera system configured to capture images of the two or more trainees, and a microphone/speaker system configured to capture speech from the two or more trainees, and wherein group virtual sensors comprise a group microphone and a group video camera.

3. The system of claim 1, wherein:
evaluating performance of the trainee group comprises:
performing a first evaluation in real-time during execution of the group training exercise and a second evaluation after completion of the group training exercise, and
determining an action taken is one of correct and not correct based on an injected event;
wherein controlling subsequent execution of the group training exercise further comprises changing a state of the virtual network based on the actions taken.

4. The system of claim 3, wherein the central processor station is configured to attribute actions taken to an individual trainee by:
accessing the software agents monitoring the virtual network to identify sources of the actions taken;
accessing and the native sensors and the trainee group sensors to identify specific trainees taking actions, times of taking actions, and content of the actions;
comparing the sources, specific trainees, times and content to the actions taken to determine the sources of the actions taken; and
comparing the content derived from the native sensors to stored, physical characteristics of the trainees.

5. The system of claim 1, wherein the virtual training program is instantiated on a plurality of virtual machines hosted on the central processor station, the virtual machines configured to be accessible to respective ones of the trainee operated media devices, wherein the central processor station is configured to execute a group training exercise adaptation based on an availability of virtual machine resources.

6. The system of claim 1, wherein the media devices are physically remote from the central processor station, wherein the central processor station is configured to install remote agents on the media devices, and wherein the native trainee sensors comprise cameras, microphones and speakers native to respective ones of the media devices and the remote agents are configured to record visual data from the cameras, audio from the microphones and speakers, and keystrokes from operation of the media devices.

7. The system of claim 1, wherein the media devices are located with the central processor station, and wherein the native sensors comprise one or more native sensors selected from a group consisting of keystroke counters, a microphone, a speaker, and a camera, and wherein the camera captures eye movement of a trainee in response to a display at the media device.

8. The system of claim 1, wherein the control station is configured to allow the user to manually inject events and adaptations.

9. The system of claim 1, wherein the central processor station is configured to analyze actions taken by the trainee group in response to each of the injections.

10. The system of claim 1, wherein the virtual training program is a cyber warfare program, and wherein the central processor station is configured to generate a virtual cyber warfare range to implement the cyber warfare program.

11. The system of claim 1, wherein the virtual training program is an emergency medical simulation.

12. The system of claim 1, wherein the adaptation comprises a change of state of the virtual network.

13. The system of claim 1, wherein the central processor system generates, and the virtual network comprises, personnel virtual objects as animated avatars of each trainee of the group of trainees.

14. The system of claim 13, wherein the animated avatars are visually similar to trainees the animated avatars represent.

15. A non-transitory, computer-readable storage medium comprising instructions for implementing an adaptive group training exercise, wherein a processor executes the instructions to:
access a virtual system and initiate a group training exercise for training a trainee group comprising two or two or more trainees, the group training exercise comprising one or more challenges to the virtual system, each of the one or more challenges comprising a pre-defined sequence including one or more injectable events;
control subsequent execution of the group training exercise comprising injecting the injectable events; and
evaluate performance of the trainee group during the subsequent execution of the group training exercise, comprising:
analyzing actions taken by the trainee group in response to each of the injections.

16. The non-transitory, computer-readable storage medium of claim 15, wherein the processor executes automatically and in real-time during execution of the group training exercise, a group training exercise adaptation based on the evaluated performance of the trainee group comprising stopping the pre-defined sequence and starting a second pre-defined sequence of one or more second injectable events,
  wherein the processor evaluates performance of the trainee group by:
    performing a first evaluation in real-time during execution of the executing group training exercise and a second evaluation after completion of the group training exercise; and
    determining an action taken is one of correct and not correct based on an injected event;
  wherein controlling subsequent execution of the group training exercise comprises changing a state of the virtual system based on actions taken,
  wherein the processor:
    accesses agents monitoring the virtual system to identify sources of the actions taken;
    accesses native sensors and trainee group sensors to identify times of taking actions, and content of the actions; and
    compares the content derived from the native sensors to stored, physical characteristics of the trainees in the trainee group,
  wherein the virtual system is instantiated on a plurality of virtual machines hosted on a physical computing platform, wherein the processor executes a group training exercise adaptation based on availability of virtual machine resources.

17. A method, implemented by a central processor station in communication with one or more media devices under operation of individual trainees, for evaluating collective expertise of a group of trainees, comprising:
  the central processor station generating a virtual training program comprising a virtual network;
  deploying software agents configured to access data captured by trainee group sensors and from native sensors installed on the trainee operated media devices;
  initiating a group training exercise, corresponding to the virtual training program, for two or more trainees, the group training exercise comprising one or more challenges, each of the one or more challenges comprising a first pre-defined sequence of one or more injectable events, the first pre-defined sequence corresponding to a first pre-defined state of the virtual network;
  providing a visual display of the group training exercise at a control station in communication with the central processor station, the control station comprising a user display and a user operated control device;
  controlling a subsequent execution of the group training exercise comprising injecting the injectable events;
  executing a collective performance evaluation of the trainee group during the subsequent execution of the group training exercise; and
  based on the collective performance evaluation, automatically and in real-time during the subsequent execution of the group training exercise, adapting the group training exercise comprising:
    stopping the first pre-defined sequence, and
    starting a second pre-defined sequence of one or more second injectable events, the second pre-defined sequence corresponding to a second pre-defined state of the virtual network.

18. The method of claim 17, wherein the virtual network is a virtual cyber range comprising one or more virtual network components, the virtual network and each of the virtual network components instantiated on a virtual machine, wherein the one or more challenges comprise a simulated cyber warfare attack, and wherein evaluating execution of the group training exercise comprises receiving and evaluating each action taken.

19. A non-transitory computer-readable storage medium comprising machine instructions, executable by a processor for initiating, controlling, and adapting a group training exercise, and for evaluating collective expertise of a group of trainees performing the group training exercise, wherein the processor:
  generates a virtual training program comprising a virtual network having one or more pre-defined states;
  deploys software agents configured to access data captured by trainee group sensors and from native sensors installed on trainee operated media devices in communication with the processor;
  initiates the group training exercise for two or more trainees, the group training exercise comprising one or more challenges, each of the one or more challenges comprising a first pre-defined sequence of one or more injectable events, the first pre-defined sequence corresponding to a first pre-defined state of the virtual network;
  provides a visual display of the group training exercise at a control station in communication with the processor, the control station comprising a user display and a user operated control device;
  controls a subsequent execution of the group training exercise comprising injecting the injectable events;
  executes a collective performance evaluation of the trainee group during the subsequent execution of the group training exercise; and
  based on the collective performance evaluation, automatically and in real-time during the subsequent execution of the group training exercise, adapts the group training exercise, wherein the processor:
    stops the first pre-defined sequence, and
    starts a second pre-defined sequence of one or more second injectable events, the second pre-defined sequence corresponding to a second pre-defined state of the virtual network.

20. The computer-readable storage medium of claim 19, wherein the processor attributes actions taken to an individual trainee by:
  accessing the software agents monitoring the virtual network to identify sources of the actions taken;
  accessing the native sensors and the trainee group sensors to identify specific trainees taking actions, times of taking actions, and content of the actions;
  comparing the sources, specific trainees, times and content to the actions taken to determine the sources of the actions taken; and
  comparing the content derived from the native sensors to stored, physical characteristics of the trainees.

* * * * *